(12) United States Patent
Wood et al.

(10) Patent No.: US 9,326,404 B1
(45) Date of Patent: Apr. 26, 2016

(54) ELECTRONIC DEVICE COVER

(71) Applicant: Amazon Technologies, Inc., Reno, NV (US)

(72) Inventors: Jeffrey Robinson Wood, Mountain View, CA (US); Monica Liane Mecchella, San Francisco, CA (US); Peter John Thomas Johnson, Seattle, WA (US); Ryan C. Tong, Palo Alto, CA (US); Keeley Justin Boehmer, San Francisco, CA (US); Sarah Lynn Kirchoff, Campbell, CA (US); Paul Gregory Van Gasse, Mountain View, CA (US)

(73) Assignee: Amazon Technologies, Inc., Reno, NV (US)

( * ) Notice: Subject to any disclaimer, the term of this patent is extended or adjusted under 35 U.S.C. 154(b) by 227 days.

(21) Appl. No.: 14/034,400

(22) Filed: Sep. 23, 2013

(51) Int. Cl.
*G09G 5/00* (2006.01)
*H05K 5/03* (2006.01)

(52) U.S. Cl.
CPC . *H05K 5/03* (2013.01); *G09G 5/003* (2013.01)

(58) Field of Classification Search
CPC .......... G06F 3/01; G06F 3/044; G06F 1/1601
USPC ................................... 345/156, 174; 361/679
See application file for complete search history.

(56) References Cited

U.S. PATENT DOCUMENTS

| | | |
|---|---|---|
| 5,377,794 A | 1/1995 | Book |
| 5,607,054 A | 3/1997 | Hollingsworth |
| 7,545,634 B2 | 6/2009 | Simonian et al. |
| 8,143,982 B1 | 3/2012 | Lauder et al. |
| D672,781 S | 12/2012 | Lu |
| 8,328,008 B2 | 12/2012 | Diebel et al. |
| 8,344,836 B2 | 1/2013 | Lauder et al. |
| 8,393,464 B2 | 3/2013 | Yang et al. |
| 8,424,829 B2 | 4/2013 | Lu et al. |
| D687,438 S | 8/2013 | Lu |
| D690,702 S | 10/2013 | Chung |
| D691,145 S | 10/2013 | Nam-Su |
| D693,823 S | 11/2013 | Chen et al. |
| 8,640,864 B2 | 2/2014 | Chen et al. |
| 8,763,795 B1 | 7/2014 | Oten et al. |
| 8,807,333 B1 | 8/2014 | Cooper et al. |
| 8,878,637 B2 | 11/2014 | Sartee et al. |
| 8,887,902 B1 | 11/2014 | Liu |
| 8,928,437 B2 | 1/2015 | Lauder et al. |
| 2004/0240164 A1 | 12/2004 | Lee |
| 2006/0056838 A1 | 3/2006 | Chen |

(Continued)

OTHER PUBLICATIONS

Office Action for U.S. Appl. No. 14/034,417, mailed on Oct. 28, 2014, Jeffrey Robinson Wood, "Electronic Device Cover," 8 pages.

(Continued)

*Primary Examiner* — Jennifer Nguyen
(74) *Attorney, Agent, or Firm* — Lee & Hayes, PLLC

(57) ABSTRACT

A cover for an electronic device includes back cover, such as a tray, to receive the electronic device. The cover may also include a foldable flap that is foldable into a stand to support an electronic device held by the cover at one or more viewing angles oblique to a surface on which the cover is placed. The back cover and/or the foldable flap may include one or more activation mechanisms that, when moved relative to the electronic device, activate one or more functions of the electronic device (e.g., camera functions, display of information, etc.).

29 Claims, 15 Drawing Sheets

(56) References Cited

U.S. PATENT DOCUMENTS

| | | |
|---|---|---|
| 2006/0163095 A1 | 7/2006 | Yanagisawa et al. |
| 2006/0285283 A1 | 12/2006 | Simonian et al. |
| 2007/0254696 A1 | 11/2007 | Kajitani |
| 2010/0089779 A1 | 4/2010 | Bowers |
| 2010/0294683 A1 | 11/2010 | Mish et al. |
| 2011/0195761 A1 | 8/2011 | Lee |
| 2011/0228463 A1 | 9/2011 | Matagne |
| 2012/0006951 A1 | 1/2012 | Lin |
| 2012/0009906 A1 | 1/2012 | Patterson et al. |
| 2012/0085679 A1 | 4/2012 | Kim et al. |
| 2012/0181195 A1 | 7/2012 | Lu et al. |
| 2012/0305413 A1 | 12/2012 | Chung |
| 2013/0020214 A1 | 1/2013 | Chiou |
| 2013/0020216 A1 | 1/2013 | Chiou |
| 2013/0043148 A1 | 2/2013 | Chen et al. |
| 2013/0048517 A1 | 2/2013 | Mecchella |
| 2013/0075280 A1 | 3/2013 | Besner |
| 2013/0134061 A1 | 5/2013 | Wu et al. |
| 2013/0146482 A1 | 6/2013 | Huang |
| 2013/0279100 A1 | 10/2013 | Fontana et al. |
| 2014/0043121 A1 * | 2/2014 | Sartee et al. ............. 335/219 |
| 2014/0071607 A1 | 3/2014 | Frinak et al. |
| 2014/0071654 A1 | 3/2014 | Chien et al. |
| 2014/0131225 A1 | 5/2014 | Couch, III et al. |
| 2014/0216976 A1 | 8/2014 | Conarro |
| 2014/0218619 A1 | 8/2014 | Kajitani |
| 2014/0238876 A1 | 8/2014 | Chen et al. |
| 2014/0262876 A1 | 9/2014 | Bates et al. |
| 2014/0291176 A1 | 10/2014 | Chung |
| 2014/0311927 A1 | 10/2014 | Kang |
| 2015/0015777 A1 | 1/2015 | Osborne et al. |

OTHER PUBLICATIONS

Office Action for U.S. Appl. No. 13/220,549, mailed on Mar. 21, 2014, Monica Liane Mecchella, "Transformable Carrying Case," 10 pages.

Office action for U.S. Appl. No. 13/220,549, mailed on Jul. 24, 2013, Mecchella, "Transformable Carrying Case," 10 pages.

Office action for U.S. Appl. No. 13/220,549, mailed on Nov. 29, 2013, Mecchella, "Transformable Carrying Case," 12 pages.

Office Action for U.S. Appl. No. 14/034,280, mailed on Feb. 18, 2015, Jeffrey Robinson Wood, "Electronic Device Cover", 16 pages.

Office action for U.S. Appl. No. 14/034,280, mailed on Aug. 26, 2015, Wood et al., "Electronic Device Cover With Device Activating Mechanism," 15 pages.

* cited by examiner

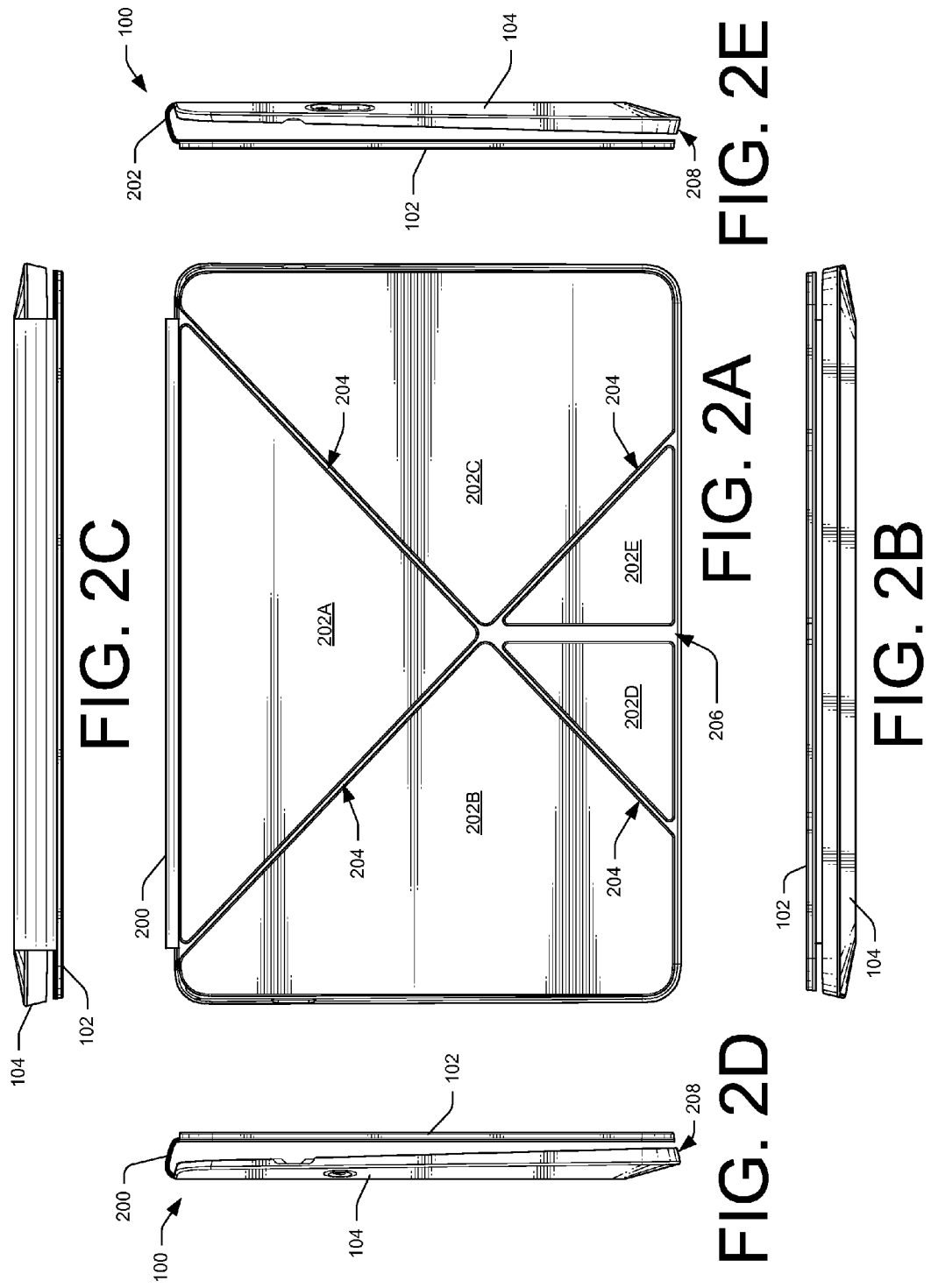

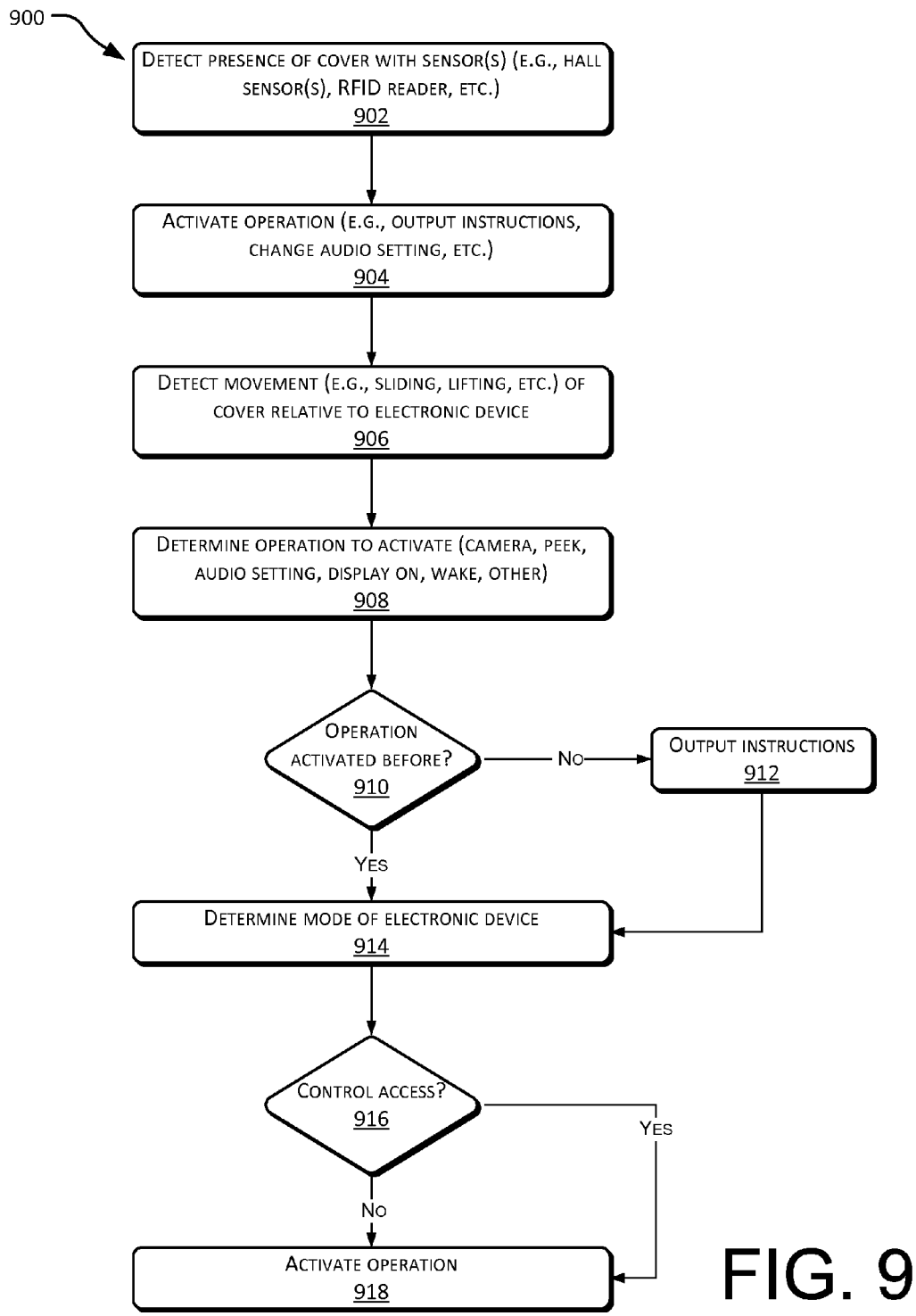

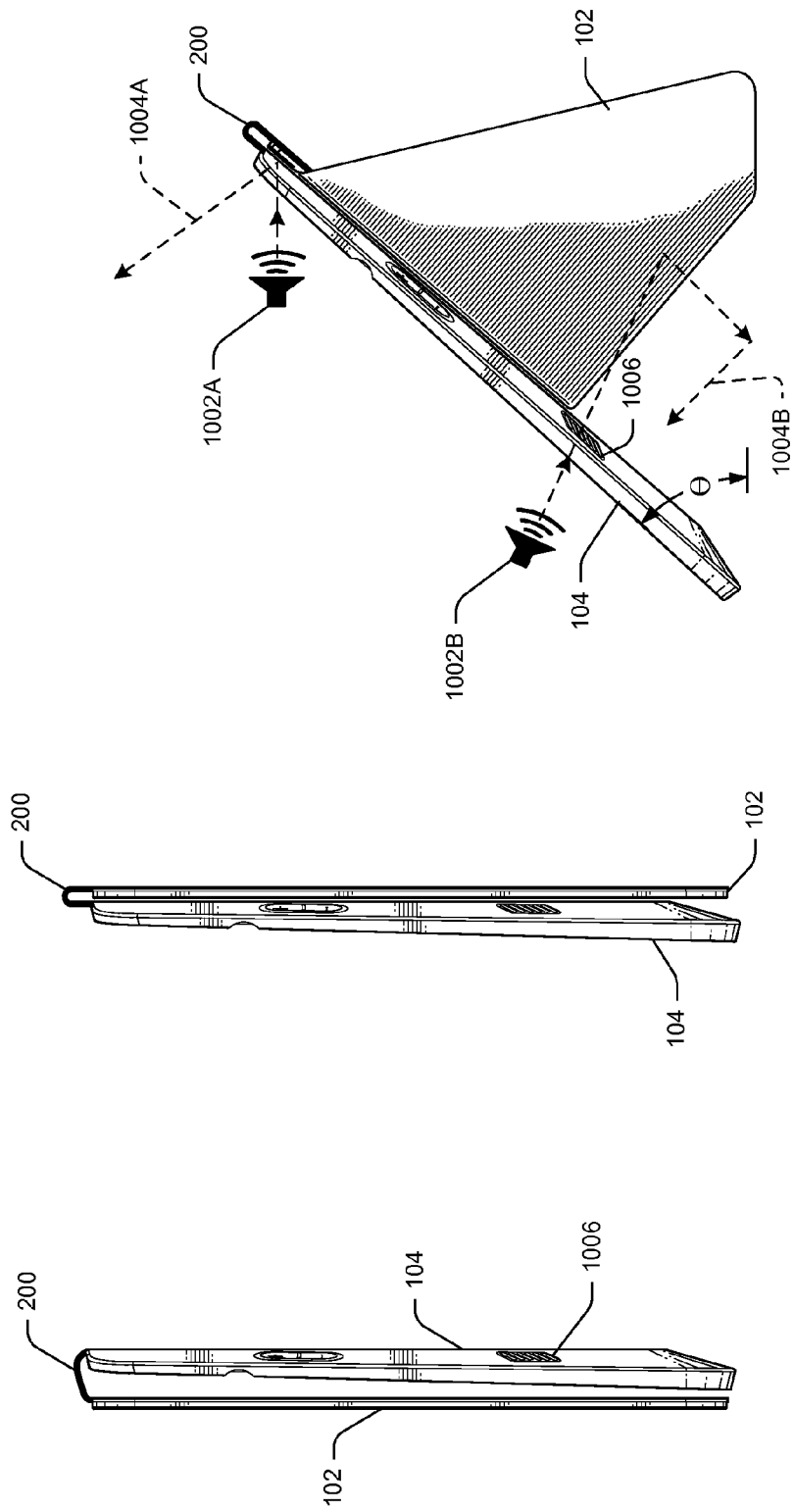

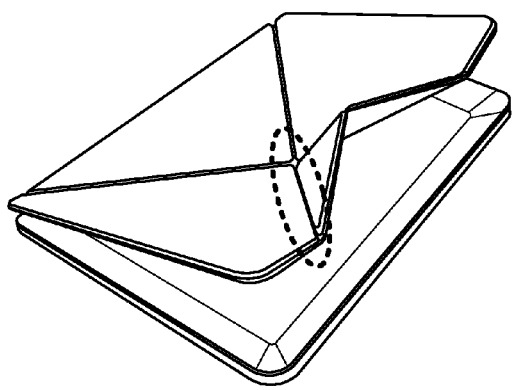
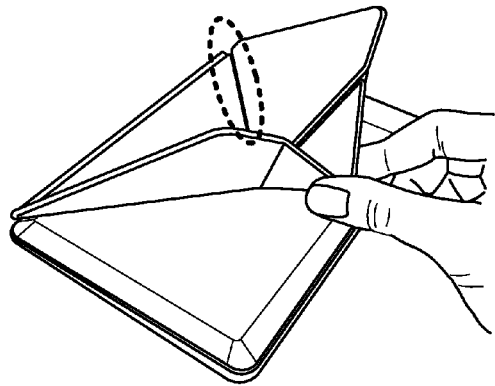
FIG. 13A   FIG. 13B
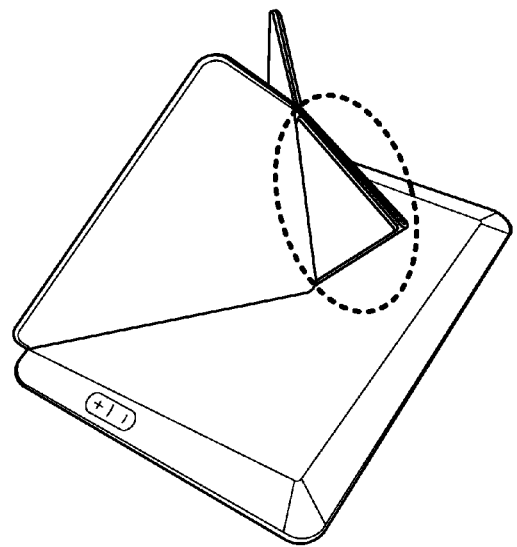
FIG. 13C

ELECTRONIC DEVICE COVER

BACKGROUND

Covers provide a convenient way of transporting and protecting various objects, such as electronic devices, books, and the like. A wide variety of covers exist for holding a variety of different objects.

With some conventional covers, a user places an object in the cover during non-use of the object, and removes the object from the cover and sets the cover aside during use of the object. For example, a user may store a tablet computer in a cover during non-use. When the user desires to use the tablet computer, the user may remove the tablet computer from the carrying case and either hold it or set it on a desk or other work surface.

With other conventional covers, the cover may protect the object during non-use and may remain attached to the object during use. For example, tablet computer covers protect the tablet computer during non-use. During use, the cover may simply fold back to allow the user to use the tablet computer without completely removing the cover.

However, neither of these types of conventional covers is designed to aid in the use of the object. Rather, these conventional covers must be removed during use else they get in the way of convenient use of the object.

BRIEF DESCRIPTION OF THE DRAWINGS

The detailed description references the accompanying figures. In the figures, the left-most digit(s) of a reference number identifies the figure in which the reference number first appears. The use of the same reference numbers in different figures indicates similar or identical items.

FIGS. 2A-2E are top, front, back, left-side, and right-side views, respectively, of the example cover of FIG. 1A and FIG. 1B.

FIG. 9 is a flowchart illustrating an example method of activating an operation of an electronic device responsive to motion of the electronic device relative to a cover.

FIG. 10A, FIG. 10B, and FIG. 10C illustrate a closed position, an open position, and a stand position, respectively, into which the example cover of FIG. 1A and FIG. 1B is movable.

FIG. 1B is configured to support an electronic device when the cover is in the stand position.

FIGS. 13A-13C illustrate features of the example cover of FIG. 1A and FIG. 1B which prevent the cover from being folded incorrectly.

DETAILED DESCRIPTION

Figure 1A:
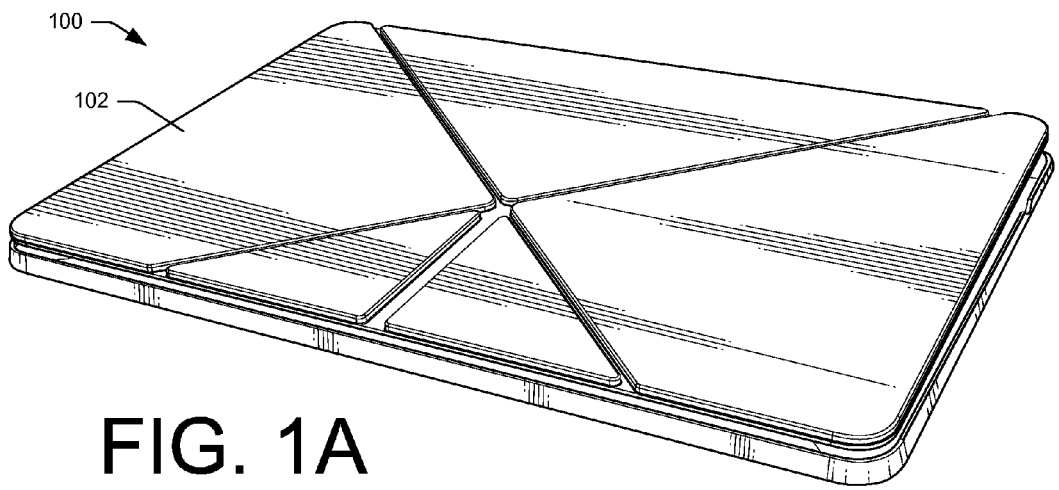
FIG. 1A and FIG. 1B are top and bottom perspective views, respectively, of an example cover for an electronic device in a closed position.

As discussed above, existing covers provide a convenient way to protect and transport objects, such as tablet computers and other electronic devices. However, existing covers have limited functionality and do not enhance the use of the electronic devices.

This disclosure describes example covers for electronic devices that not only protect the electronic device, such as during transport of the electronic device, but also enhance the use of the electronic device. As used herein, the term "cover" includes carrying cases, protective sleeves, and other holders for electronic devices. The disclosure also describes electronic devices usable with the example covers. The disclosure also describes various methods implemented using covers and/or electronic devices such as those described herein.

In one aspect, covers according to some embodiments of this disclosure may be configured to activate one or more operations of an electronic device in response to relative movement of the electronic device and the cover. For example, relative movement between the electronic device and the cover may expose a camera of the electronic device. The movement may additionally or alternatively activate an application associated with the camera of the electronic device. As another example, relative movement between the electronic device and the cover may expose one or more speakers of the electronic device and/or may connect the electronic device with one or more external speakers. The movement may additionally or alternatively change an audio setting of the electronic device (e.g., adjust a volume of the electronic device, activate an audio signal processing algorithm, etc.). As another example, lifting a portion of a flap that covers a display of the electronic device may expose a portion of the display and may cause the electronic device to perform an operation (e.g., display information on the exposed portion of the display). Lifting another portion of the flap may expose another portion of the display and may cause the electronic device to perform another operation (e.g., display different information on the exposed other portion of the display). Lifting both portions of the flap at the same time may cause the electronic device to perform yet another operation (e.g., turn on the display of the device, wake the device, etc.).

In another aspect, an example cover may include a front cover and a back cover. The front cover may include a foldable flap. The foldable flap may be movable between multiple positions, including a closed position (in which the foldable flap is substantially planar and covers an inner surface of the back cover), an open position (in which the foldable flap is substantially planar and lies substantially parallel and adjacent to an outer surface of the back cover), and a stand position (in which the foldable flap folds to form a stand to support the back cover at an angle relative to a support surface on which the cover is placed). In some instances, the stand position may be configured to support an electronic device in multiple different orientations relative to the support surface. Other example covers may omit the back cover entirely. In such examples, the front cover may couple directly to the electronic device (e.g., to cover a display of the electronic device).

Covers according to this disclosure may be designed for use with a variety of objects, such as, for example, electronic book reader devices, tablet computers, mobile devices, portable gaming devices, electronic picture frames, display screens, or other electronic devices.

Additional details are described below with reference to several example embodiments.

Example Cover for Electronic Device

Figure 1B:
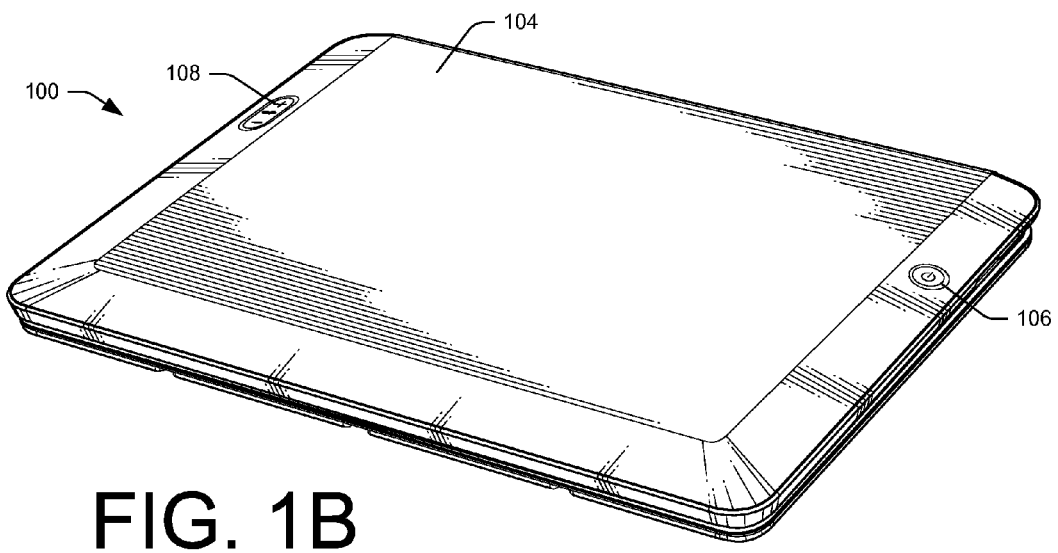

FIG. 1A, FIG. 1B, and FIGS. 2A-2E illustrate an example cover 100 for an electronic device in a closed position. FIG. 1A is a perspective view of the cover 100 with a front cover 102 face up. The front cover 102 comprises a substantially planar, foldable flap. FIG. 1B is a perspective view of the cover 100 with a back cover 104 shown face up. The back cover 104 comprises a tub or tray having a receptacle for receiving and retaining an electronic device. The cover 100 also includes one or more controls, such as a power button 106 and volume control 108, which may be used to actuate corresponding controls of an electronic device housed in the cover 100.

FIGS. 2A-2E illustrate top, front, back, left-side, and right-side views, respectively, of the cover 100. As best shown in FIG. 2D and FIG. 2E, the front cover 102 is coupled to the back cover 104 along a longitudinal edge of the back cover 104 by a flexible hinge 202 that allows the front cover 102 to fold relative to the back cover 104. In the illustrated example, the flexible hinge 202 comprises an extension of one or more sheets of material from which the front cover 102 is constructed. However, in other embodiments, the flexible hinge 200 may be made of a separate piece of material than the front cover 102.

As shown in FIG. 2A, the front cover 102 includes multiple substantially planar panels 202A, 202B, 202C, 202D, and 202E (collectively "panels 202") coupled together by flap hinges 204 and 206. In one example, the multiple substantially planar panels 202 are coupled together by a flexible material that at least partially surrounds or covers the panels 202. For instance, the panels 202 may be interposed or sandwiched between flexible sheets of material. Such an example is described in detail below with reference to FIGS. 14A-14C and FIG. 15. By way of example and not limitation, the flexible material may comprise natural or synthetic fabric or sheets of material, foam, leather, faux leather, plastic, rubber, combinations of these, or other flexible materials. In some examples, the panels 202 may comprise separate individual pieces of material bonded, adhered, stitched, co-molded, ultrasonically welded, or otherwise affixed to the flexible material. In that case, the flexible material serves the dual purposes of holding the panels 202 in position relative to one another and of allowing the panels 202 to fold relative to one another along flap hinges 204 and 206. Additionally or alternatively, the panels 202 may be joined directly to each other by stitching, sonic welding, adhesive, or the like.

In another example, the panels 202 may be formed integrally and the flap hinges 204 and 206 may represent score lines, thinned sections of material, perforations, weakened sections, living hinges, or other features designed to allow the panels 202 to fold relative to one another.

At least some of the flap hinges (flap hinges 204 in this example) comprise directional hinges that allow adjacent panels to fold relative to each other in a first direction, but limit the adjacent panels from folding relative to each other in a second direction opposite the first direction. Additional details of the function and construction of directional hinges are given below with reference to FIGS. 13A-13C and FIGS. 14A-14C. Other hinges (hinge 206 in this example) comprise non-directional or free hinges that are free to fold in either direction around a fold axis.

In the example of FIG. 2A, the front cover 102 is shown to include five panels 202 which are arranged such that a size and shape of the perimeter of the front cover 102 substantially matches a size and shape of the perimeter of the back cover 104. However, in other embodiments, the back cover 104 may comprise more or fewer panels, in which case the front cover 102 may be configured to bend at different locations (i.e., different fold lines or hinges) than those shown. Moreover, in some embodiments, the front cover 102 need not necessarily match the size and shape of the perimeter of the back cover 104.

In one example, the panels 202 which collectively define the perimeter of the front cover 102 comprise rigid or semi-rigid sheets of material. As used herein, a sheet of material is rigid or semi-rigid if it substantially holds its shape and resists deformation by its own weight when held by its edge. One specific example of a rigid or semi-rigid material that may be used is a 0.3 millimeter thick sheet of polycarbonate or polypropylene. However, numerous other materials and thicknesses may alternatively be used as described further below. The back cover 104 may be made of one or more rigid or semi-rigid materials. In one specific example, the back cover may be molded of polycarbonate acrylonitrile butadiene styrene (PCABS). In some embodiments, the back cover 104 may additionally include portions made from a flexible, elastomeric material (e.g., around at least some edges of the back cover to help retain the electronic device), such as silicone, rubber, or the like.

As best shown in FIG. 2D and FIG. 2E, the free longitudinal edge of the back cover 104 (the edge opposite the flexible hinge 200) includes a trough or lip 208 to support the electronic device in the cover 100 and prevent it from slipping out.

Figure 3:
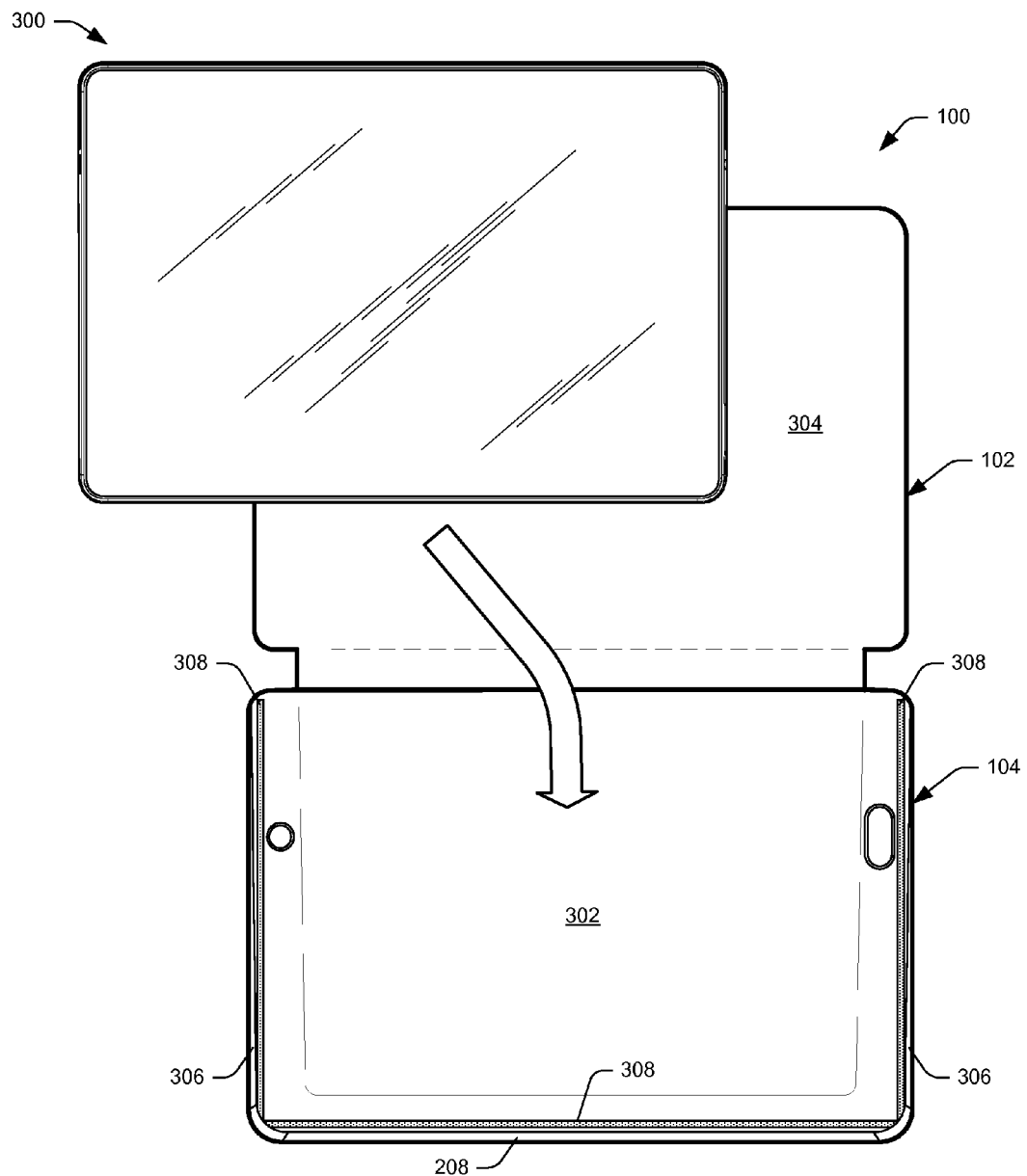
FIG. 3 depicts the example cover of FIG. 1A and FIG. 1B in a flat position, with an example electronic device being inserted therein.

FIG. 3 depicts the cover 100 with the front cover 102 open and lying substantially coplanar with the back cover 104 to allow an electronic device 300 to be inserted into the receptacle 302 of the back cover 104. Specifically, the electronic device 300 is placed on top of an inner surface 304 of the front cover 102 and slid down into the back cover 104 between the lateral edges 306 of the back cover 104. The lateral edges 306 act as guide rails to guide the electronic device 300 for sliding movement parallel to the lateral edges 306 of the back cover 104. The electronic device 300 is inserted until it reaches and abuts the lip 208 along the longitudinal edge of the back cover 104. The lip 208 limits movement of the electronic device 300 past the lip 208, and prevents the electronic device 300 from inadvertently sliding out of the cover 100. In this example, the receptacle 302 is bounded on four sides by the lip 208, the lateral edges 306, and the inner surface of the back cover 104, which collectively hold the electronic device 300 in the receptacle 302. The receptacle 302 is open on an edge opposite the lip 208 to allow the electronic device 300 to slide in that direction. However, in other examples, the receptacle may be configured in other arrangements capable of receiving and holding an electronic device. In still other examples, the receptacle may be omitted (e.g., in the case of a flat back cover and/or in the case of a cover flap that couples to the electronic device without a back cover).

In some embodiments, raised skid pads or "slides" 308 may also be disposed in the receptacle 302, on an inner surface of the back cover 104 to further aid in the sliding movement of the electronic device 300 in the receptacle 302. The slides 308 may be raised a small distance (e.g., 0.3 millimeters) relative to the inner surface of the back cover 104. The slides 308 may be made of a material having a coefficient of friction (static and/or kinetic) relative to the electronic device 300 lower than a coefficient of friction of other portions of the back cover 104 relative to the electronic device. For example, the slides 308 may be made of Polytetrafluoroethylene (PTFE), Teflon, nylon, ultra high molecular weight polyethylene (PE), smooth or polished metal, or the like. In other examples, the slides may be made of other materials and may be coated with a material having lower coefficient of friction (static and/or kinetic) than the material being coated, such as soft touch paint, or the like. While the slides 308 are shown as two thin rectangles proximate the lateral edges 306 and a thin rectangle proximate the lip 208 of the back cover 104, in other examples, the slides may be different shapes and/or sizes, the slides may be positioned in other locations, and any number of one or more slides may be used. In still other examples, all or part of the inner surface of the back cover 104 or the receptacle 302 may be made or coated with a low friction material.

Figure 4:
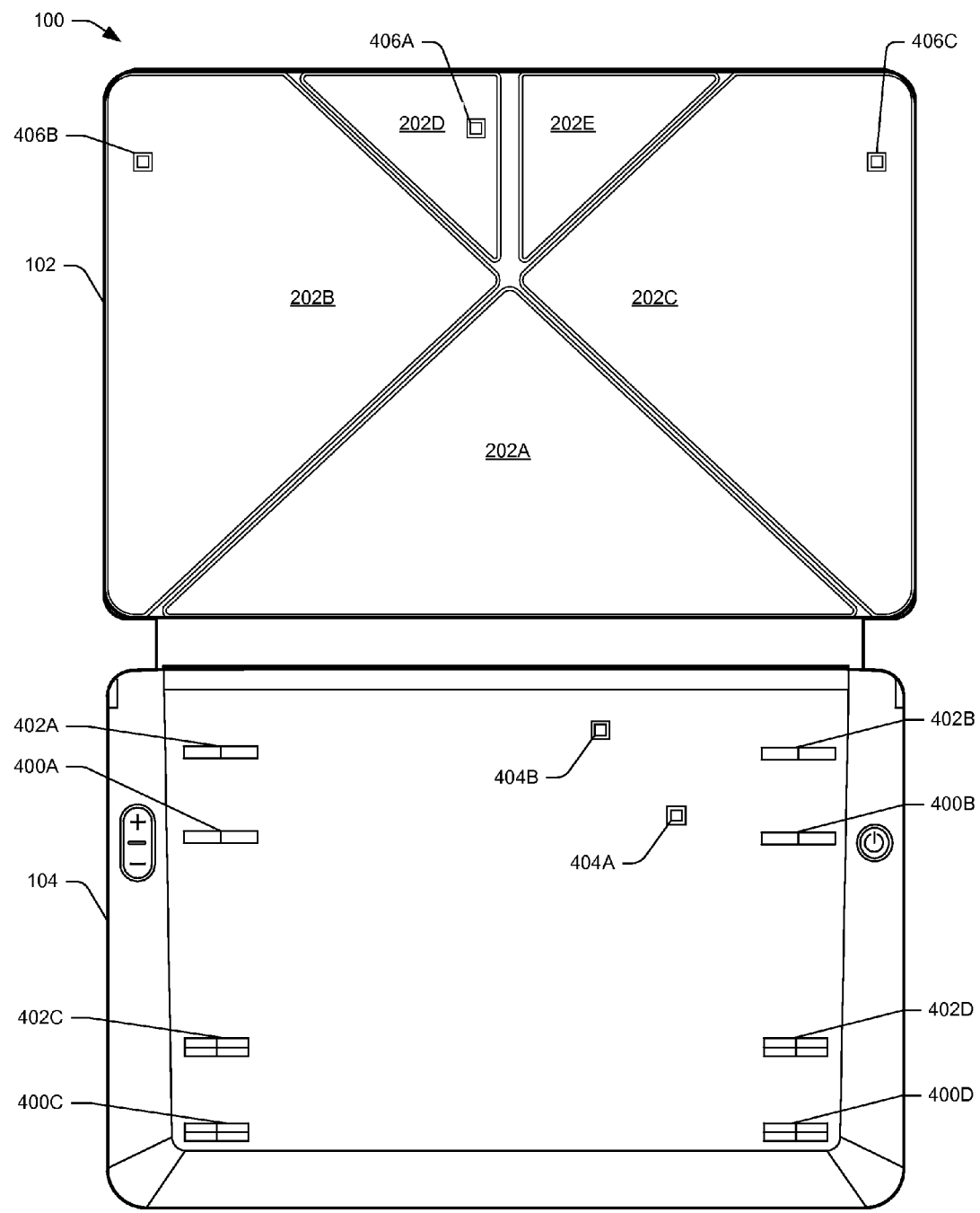
FIG. 4 is schematic view of the example cover of FIG. 1A and FIG. 1B, showing example locations of elements that may be used to retain an electronic device and/or activate one or more functions of the electronic device.

FIG. 4 is schematic view of the cover 100 of FIG. 1A and FIG. 1B, showing example locations of elements that may be used to retain an electronic device and/or activate one or more functions of the electronic device. As shown, the cover 100 includes a first retention mechanism comprised of four retention elements 400A, 400B, 400C, and 400D (collectively referred to as "first retention mechanism 400") disposed in the back cover 104 to hold the electronic device in a first position relative to the back cover 104. The cover 100 also includes a second retention mechanism also comprised of four retention elements 402A, 402B, 402C, and 402D (collectively referred to as "second retention mechanism 402") disposed in the back cover 104 to hold the electronic device in a second position relative to the back cover 104. In this example, the second position is spaced a distance in the lateral direction from the first position. In some examples, the first retention mechanism 400 and the second retention mechanism 402 may each comprise one or more ferromagnetic elements to at least one of attract, or be attracted by, ferromagnetic elements in the electronic device. As used herein, a ferromagnetic element is an element that is susceptible to magnetization, including permanent magnets and materials (e.g., iron based metals) that are attracted by permanent magnets. For instance, retention elements 400A-D and 402A-D may comprise magnets to attract complimentary magnets or ferrous metal plates located in the electronic device, or vice versa. In some specific examples, each of retention elements 400A, 400B, 402A, and 402B may comprise paired magnets, while each of retention elements 400C, 400D, 402C, and 402 may comprise a pair of paired magnets.

While in this example the first retention mechanism is described as being a first set of ferromagnetic elements and the second retention mechanism is described as being a second set of ferromagnetic elements, in other examples, other retaining means may be used for the first and/or second retention mechanisms. For instance, the first and/or second retention mechanisms may comprise latches that engage the electronic device, or ledges that protrude laterally inward from the top of the lateral edges to retain the electronic device.

In still other examples, a single retention mechanism may be used, which retains the electronic device in both the first and second positions. In one such example, the electronic device may be fixed to a platform in the surface of the back cover, and the platform may be slidable relative to the remainder of the back cover (e.g., on rails) to facilitate movement of the electronic device between the first position and the second position. In this example, the single retention mechanism to couple the electronic device to the platform may comprise one or more ferromagnetic elements, latches, snaps, clamps, or other mechanical fastening means.

By using two ferromagnetic retention mechanisms 400 and 402 spaced a distance apart, such as those shown in FIG. 4, an electronic device may be placed in the cover 100 and retained in, and selectively slid back and forth between, the first and second positions. As noted above, the lateral sides 306 of the back cover act as guide rails to guide the electronic device and the slides 308 reduce friction between the electronic device and the back cover 104 facilitating easy movement between the first and second positions.

In the illustrated example, the back cover 104 also includes one or more activation mechanisms 404A and 404B (collectively referred to as "activation mechanisms 404"). The activation mechanisms 404 may be used to activate one or more functions or operations of an electronic device housed in the cover 100. In one example, the activation mechanisms 404 may comprise magnets to activate Hall effect sensors located in the electronic device. However, in other examples, the activation mechanisms 404 may comprise radio frequency identification (RFID) chips or other mechanism capable of activating an operation of the electronic device.

In one example, the activation mechanism 404A may be detectable by a sensor in the electronic device to signal that the electronic device is housed in the cover 100. In response to detecting that it is in the cover 100, the electronic device 300 may, for example, output information such as a tutorial informing the user how to use the cover 100, marketing information or advertisements, or the like. In another example, in response to detecting that it is in the cover 100, the electronic device 300 may change an audio setting of the electronic device 300. Additional details of this audio setting example are provided below with reference to FIG. 9.

As another example, the activation mechanism 404B may be detectable by a sensor in the electronic device when the electronic device is positioned to align the activation mechanism 404B with the sensor in the electronic device. In response to detecting, by the sensor, the activation mechanism 404B, the electronic device may be configured to activate an application associated with a camera of the electronic device responsive to movement of the electronic device from the first position to the second position. Additional details of this camera activation example are provided below with reference to FIG. 5A and FIG. 5B.

As another example, relative movement between the electronic device and the cover may expose one or more speakers of the electronic device and/or may connect the electronic device with one or more external speakers. In such an example, the activation mechanism 404B may be detectable by a sensor in the electronic device when the electronic device is positioned to align the activation mechanism 404B with the sensor in the electronic device. In response to detecting, by the sensor, the activation mechanism 404B, the electronic device may be configured to change an audio setting of the electronic device (e.g., adjust a volume of the electronic device, activate an audio signal processing algorithm, etc.).

Additionally or alternatively, in some examples, the front cover 102 may include one or more activation mechanisms 406A, 404B, and 406C (collectively referred to as "activation mechanisms 406"). Similar to the activation mechanisms 404 in the back cover 104, the activation mechanisms in the front cover 102 may comprise magnets, RFID chips, or any other mechanism capable of activating an operation of the electronic device.

As discussed above, the front cover 102 comprises a foldable flap made up of multiple substantially planar panels 202. In some examples, the activation mechanisms 406 may be disposed on different ones of the panels 202. For instance, in the illustrated example, activation mechanism 406A is disposed on panel 202D, activation mechanism 406B is disposed on panel 202B, and activation mechanism 406C is disposed on panel 202C. In this way, at least some of the activation mechanisms 406 may be moved to activate a corresponding function or operation of the electronic device without moving other activation mechanisms. This arrangement may be used to implement, among other things, a "peek" functionality, in which lifting a first panel (e.g., corner panel 202B) activates a first operation of the electronic device, while lifting a second panel (e.g., corner panel 202C) activates a second operation of the electronic device. The "peek" functionality is further described below with reference to FIGS. 6 and 7.

In various examples, the cover 100 may include shielding to one side of one or more of the activation mechanisms. The shielding may be located in a portion of the cover containing the activation mechanism(s) and/or a portion of the cover that the activation mechanism(s) is proximate to in one or more positions of the cover. For instance, the activation mechanism 406A in the front cover 102 may be shielded on an outside of the front cover 102 (i.e., a side furthest from the electronic device when the cover is in the closed position of FIG. 10A) to prevent the activation mechanism 406A from inadvertently activating a Hall effect sensor in the electronic device when the cover is in the open position (as shown in FIG. 10B). Additionally or alternatively, the same result may be achieved by placing shielding at a location in an outer surface of the back cover 104 that is aligned with the activation mechanism 406A when the cover is in the open position (as shown in FIG. 10B).

The foregoing examples describe embodiments in which the cover includes various activation mechanisms to activate functions or operations of an electronic device. In other examples, one or more of the activation mechanisms may be omitted from the cover and the functions or operations of the electronic device may be activated by one or more other sensors of the electronic device (e.g., a camera or light sensor) that do not depend on an activation mechanism in the cover.

These and additional details of the construction of example covers for electronic devices are further explained below in the description of the operation of such example covers.

Example Use Case (Camera Activation)

As discussed above, in one example, an activation mechanism (e.g., activation mechanism 404B in FIG. 4) may be disposed in the cover. When the activation mechanism is aligned with or otherwise moved into proximity of a sensor in an electronic device (e.g., electronic device 300), the activation mechanism may be detected by the sensor. Detection of the activation mechanism by the sensor may activate an application associated with a camera of the electronic device responsive to movement of the electronic device from a first position, in which the camera of the electronic device is covered or obstructed by the cover, to a second position, in which the camera is exposed or unobstructed by the cover.

In the first position, the electronic device is fully inserted in the receptacle 302 of the back cover 104 and rests against the lip 208 along the longitudinal edge of the back cover 104. In this example, the retention mechanisms 400 and 402 are magnetic retention mechanisms, allowing the electronic device to slide from the first position to the second position. However, as noted above, one or more other retention mechanisms may alternatively be used.

Figure 5A:
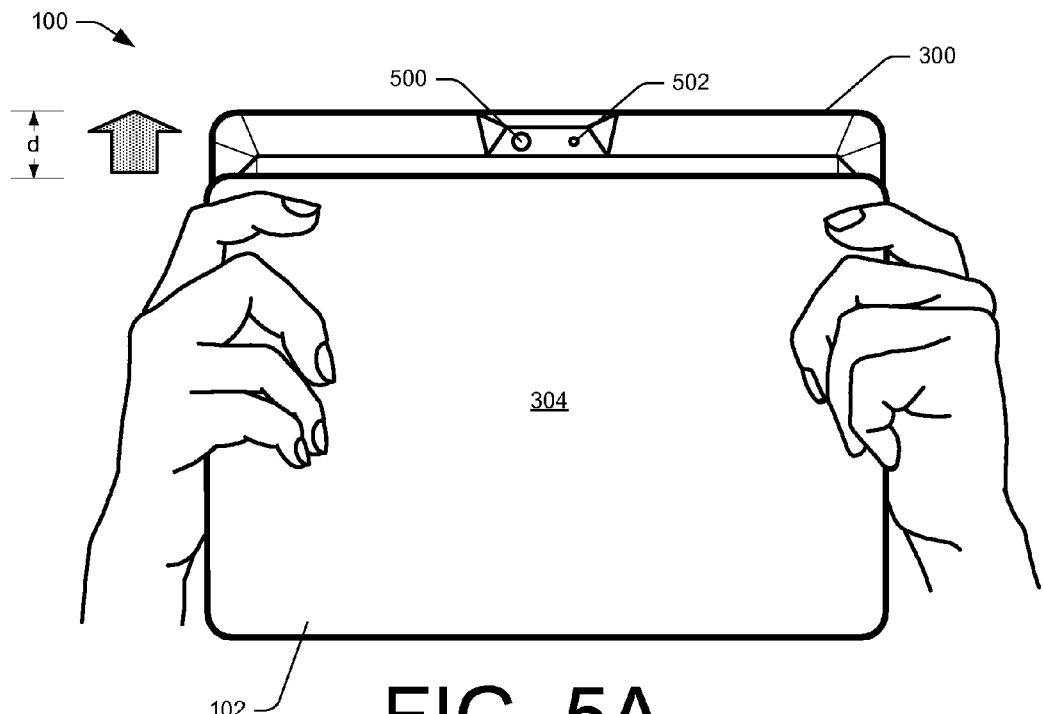
FIG. 5A and FIG. 5B are schematic back and front views, respectively, showing an example use case in which an electronic device activates a camera application in response to sliding the electronic device relative to a cover to expose a camera of the electronic device.
Figure 5B:
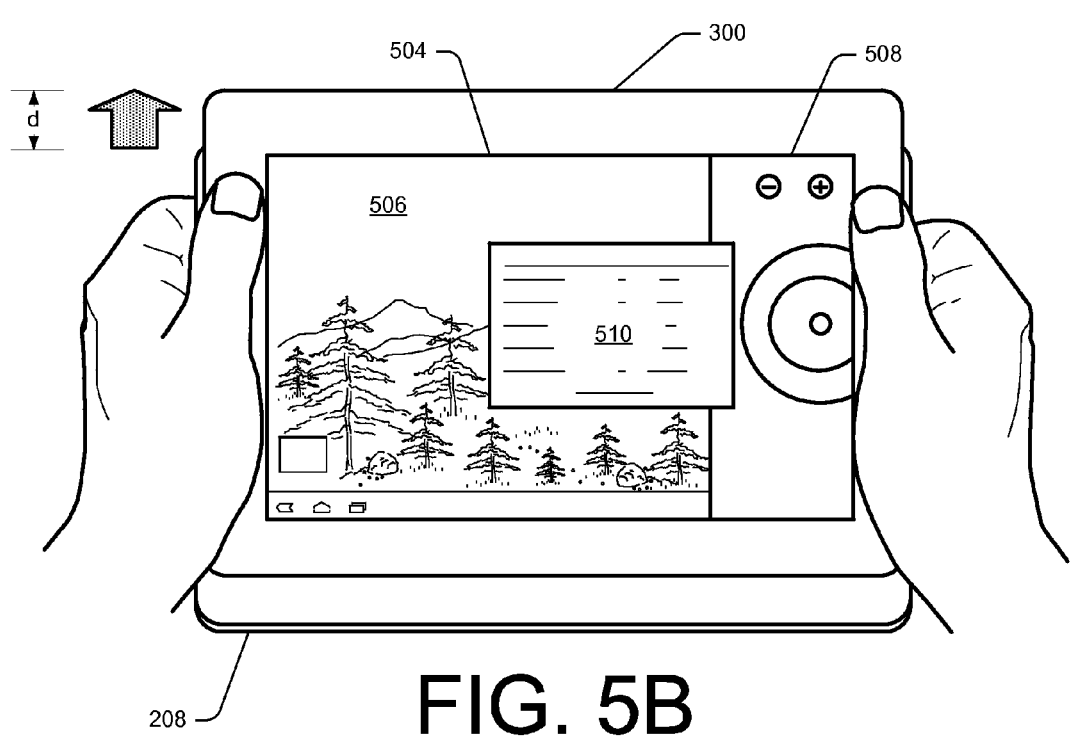

FIG. 5A and FIG. 5B depict back and front views, respectively, of the cover 100 in with the front cover 102 folded completely back about flexible hinge 200 so that the front cover 102 lies substantially parallel and adjacent to the back cover 104, thereby exposing the inner surface 304 of the front cover 102. The electronic device 300 is shown moved a distance "d" in the direction of the arrow to the second position. In the first position, a camera 500 and flash 502 of the electronic device 300 were obstructed by the cover 100. In other embodiments (not shown), a light sensor may be disposed proximate the camera 500 and flash 502. In the second position, the camera 500 and flash 502 (and light sensor if included) are exposed and unobstructed by the cover 100. Further, moving the electronic device 300 to the second position aligns the second activation mechanism 404B (see FIG. 4) with a sensor (e.g., Hall effect sensor) in the electronic device, which causes the electronic device to activate an application associated with a camera of the electronic device.

In other examples, the application associated with the camera of the electronic device may be activated in response to one or more other sensors of the electronic device (e.g., a camera or light sensor) detecting that the camera is or becomes exposed or unobstructed by the cover (e.g., when the device is moved from the first position to the second position). In such an example, the electronic device may detect the presence of the cover (e.g., based on detection of an activation mechanism such as activation mechanism 404A). Then, the electronic device may activate the camera application in response to detecting, by the camera or a light sensor, that the camera is exposed or unobstructed by the cover.

The application associated with the camera may be a camera-specific application (e.g., an application specifically designed to take pictures with the camera), or it may be another application that makes use of the camera 500 (e.g., a text message application, an email application, an optical scanner application, an augmented reality application, etc.). Activation of the application may cause a user interface to be presented on a display 506 of the electronic device 300. In the illustrated example, the application comprises a camera-specific application and the user interface includes a view finder window 506 displaying the camera field of view, a control window 508 having controls for controlling the camera (e.g., zoom, exposure, picture vs. video, etc.), and a settings window 510 for controlling one or more settings or preferences (e.g., image size, sounds, etc.).

Example Use Case ("Peek")

Figure 6:
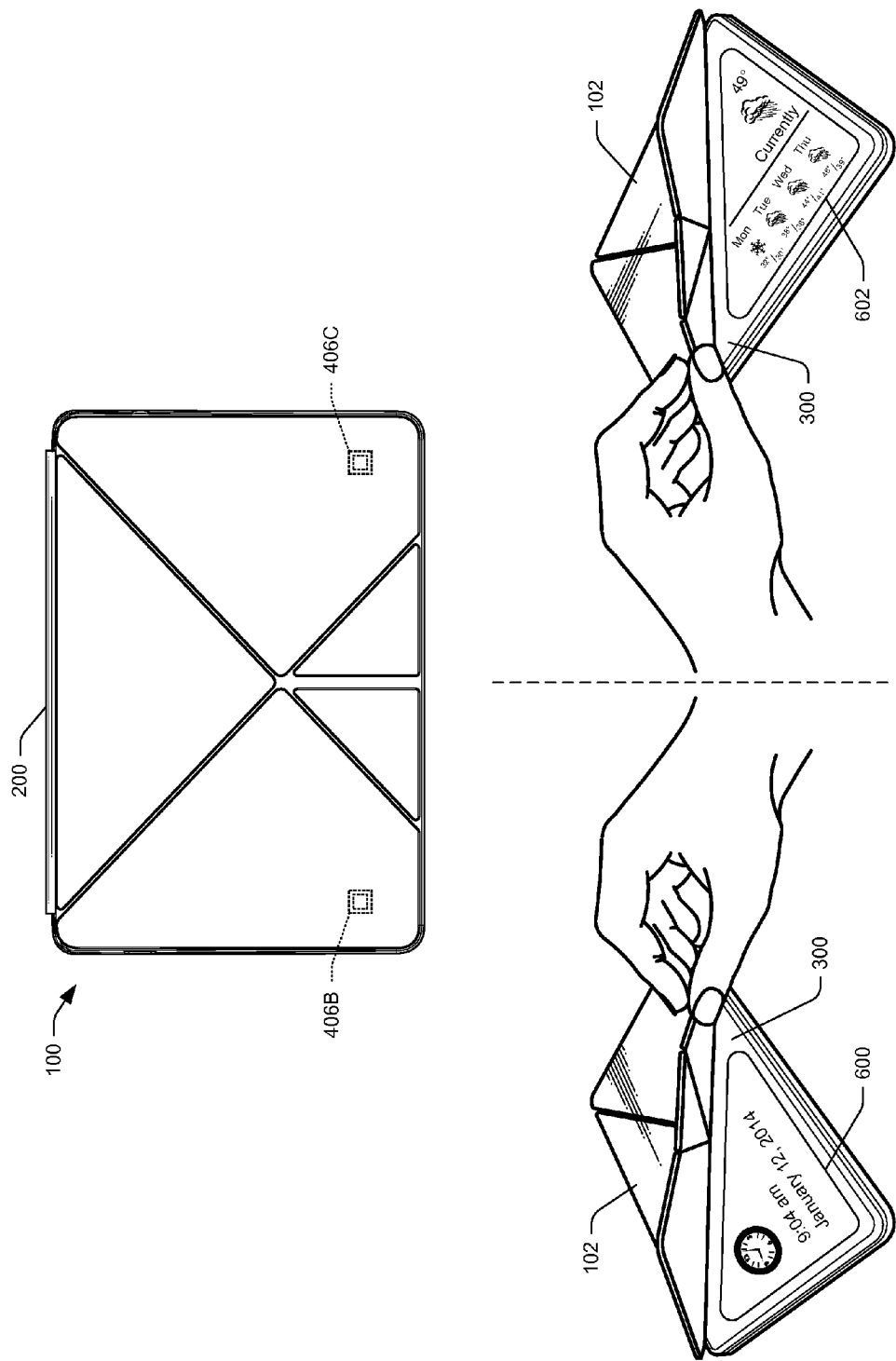
FIG. 6 is a schematic diagram showing another example use case in which lifting ("peeking" under) various portions of a flap of a cover activates different operations to be performed by the electronic device.

FIG. 6 illustrates another example use case, in which lifting a portion (less than all) of a front cover of an electronic device causes activation of a function or operation of the electronic device. For example, lifting a first portion of the front cover 102 uncovers a first portion of the display screen of the electronic device 300 and causes activation of a first operation. In the illustrated embodiment, lifting a left corner of the front cover 102 distal to the flexible hinge 200 uncovers a triangular region 600 of the display screen of the electronic device. Lifting the left corner of the front cover 102 also lifts activation mechanism 406B away from a corresponding sensor (e.g., Hall effect sensor, RFID chip, etc.) in electronic device, thereby activating a first operation of displaying a date and time on the uncovered portion of the display screen.

Lifting a second portion (again less than all) of the front cover 102 uncovers a second portion of the display screen of the electronic device 300 and causes activation of a second operation. In the illustrated embodiment, lifting a right corner of the front cover 102 distal to the flexible hinge 200 uncovers a triangular region 602 of the display screen of the electronic device. Lifting the right corner of the front cover 102 also lifts activation mechanism 406C away from a corresponding sensor (e.g., Hall effect sensor, RFID chip, etc.) in electronic device, thereby activating a second operation of displaying weather information on the uncovered portion of the display screen.

While the activation mechanisms 406B and 406C are shown located proximate substantially planar panels 202B and 202C, respectively, in other embodiments, the activation mechanisms may be located proximate to other substantially planar panels. In one such embodiment, the activation mechanisms 406B and 406C may be located proximate substantially planar panels 202D and 202E, respectively.

In some embodiments, the portion of the display screen on which information is presented is based on the portion of the front cover 102 that is lifted. That is, by lifting more of the front cover 102, correspondingly more of the display screen may present information. In embodiments in which the front cover has multiple substantially planar panels 202, each panel 202 may have an activation mechanism and the portion of the display screen on which information is presented is based on the number of panels (and corresponding activation mechanisms) that are lifted from the display screen. That is, by lifting one panel, a region of the display uncovered by lifting the panel will display information. Each additional panel lifted may "turn on" an additional portion of the display screen uncovered by lifting the respective panel. The information presented on each portion of the display screen corresponding to the panels may be predetermined (i.e., each portion of display screen will always present the same information), may be set by a user, and/or may be determined based on a current mode or state of the device (e.g., asleep, screen off, locked, currently open applications, etc.). In other embodiments, the front cover may include a continuous flexible magnetic sheet. In that case, the portion of the display screen on which information is presented may correspond to the portion of the display screen uncovered by lifting the portion of the front cover.

The information displayed in regions 600 and 602 in FIG. 6 are merely examples. In other embodiments, other information may be presented in response to lifting portions of a cover of an electronic device and/or operations other than presenting information may be performed in response to lifting portions of the cover. By way of example and not limitation, other information that may be presented in response to lifting a portion of a cover include calendar information (e.g., a calendar, appointments, reminders, etc.), financial information (e.g., stock tickers, account balances, trade announcements, etc.), an email message, a text message, a photograph, an image, audio information (e.g., artist, song title, album cover, etc.), a video, voicemail information, call information, or a menu or interface (e.g., displaying settings and/or controls to change settings of the electronic device). By way of example and not limitation, other operations that may be performed include playing audio content, pausing or stopping audio content, increasing and/or decreasing audio volume, turning off an alarm, sending a call to voicemail, accepting a meeting invitation, or the like.

In some embodiments, lifting both the first and second portions of the front cover 102 concurrently (either simultaneously or sequentially), may cause activation of a third operation. By way of example and not limitation, the third operation may include turning on the display of the electronic device, waking the electronic device, presenting a lock screen of the electronic device, or the like.

Figure 7:
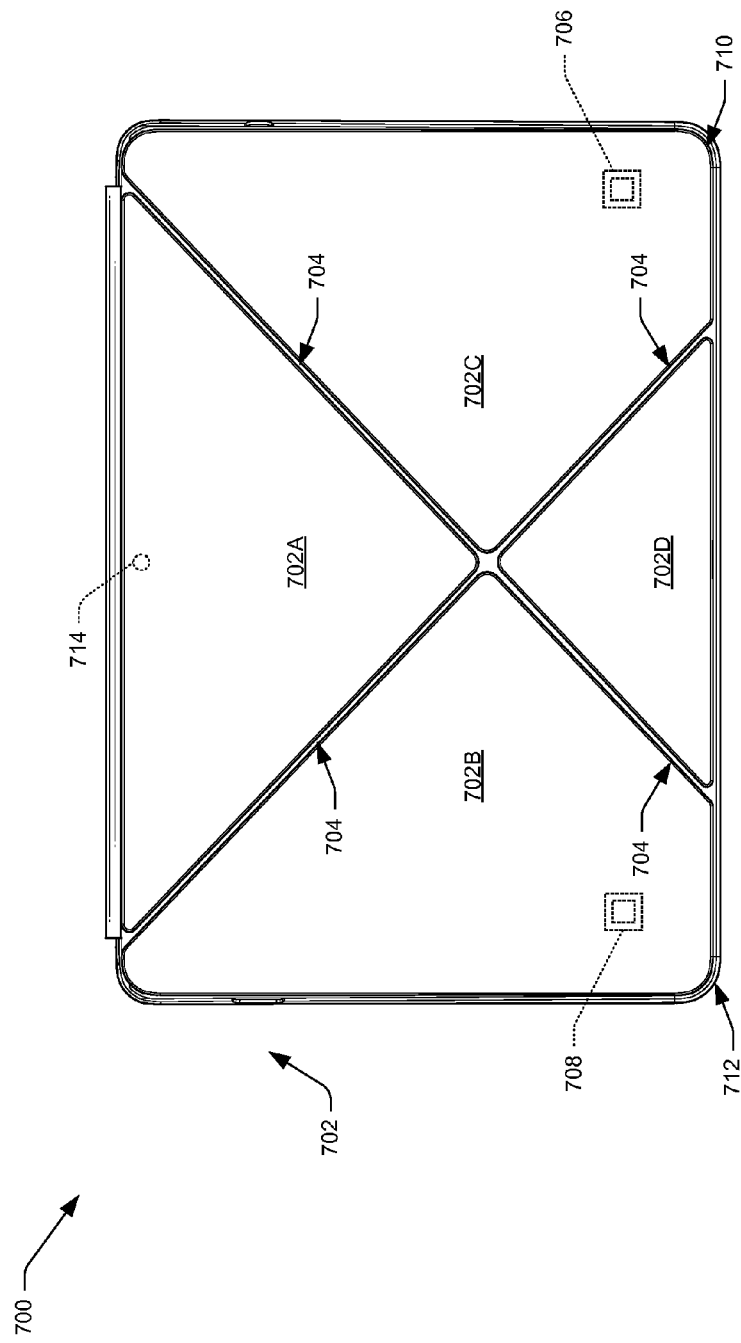
FIG. 7 is a top view of another example cover that may be used to implement variations of peek functionality.

FIG. 7 illustrates another example cover 700 that may be used to implement a variation of the peek functionality. In this example, the cover 700 includes a foldable flap 702 having a first portion 702A, a second portion 702B, a third portion 702C, and a fourth portion 702D. The portions 702A-702D of the foldable flap 702 comprise substantially planar panels. Each of the portions 702A-702D is foldably coupled to two of the other portions by respective flap hinges. A first activation mechanism 706 is disposed in the third portion 702C of the foldable flap 702, and a second activation mechanism 708 is disposed in the second portion 702B of the foldable flap 702. In this embodiment, lifting a first corner 710 of the foldable flap 702 results in both the third portion 702C and 702D being lifted and removes activation mechanism 706 from a corresponding sensor (e.g., Hall effect sensor, RFID reader, etc.) in the electronic device and, thereby, activates a first operation of the electronic device. Lifting a second corner 712 of the foldable flap 702 results in both the first portion 702A and the second portion 702B (and hence the second activation mechanism 708) being lifted, thereby activating a second operation of the electronic device. In some examples, the flap hinges 704 may comprise directional hinges (as described in detail with reference to FIGS. 13A-13C and 14A-14C). In such examples, continued lifting of either the first corner 710 or the second corner 712 will cause the directional flap hinges 704 to bind, thereby lifting the remaining portions of the foldable flap away from the display of the electronic device.

The electronic device may activate a third operation in response to detecting the lifting of both the first activation mechanism 706 and the second activation mechanism 708 concurrently. Alternatively, the electronic device may activate the third operation in response to detecting the lifting the first portion 702A of the foldable cover 702 by a front facing camera or light sensor 714 of the electronic device. In other examples, the electronic device may detect lifting of other portions (e.g., portions 702B-702D) of the foldable cover 702 using one or more front facing cameras and/or light sensors instead of or in addition to the Hall effect sensors or RFID readers described above.

While the foregoing examples describe activating an operation of an electronic device in response to "peeking" under a front cover, in other embodiments, an operation of an electronic device may be activated in response to "peeking" under a back cover. For instance, in one example, a cover may include a back cover that may be folded or otherwise moved to peek under the cover and reveal a rear facing camera of the electronic device. In response to peeking under the cover to reveal the rear facing camera, the electronic device may activate an application associated with the rear facing camera of the electronic device.

Example Electronic Device

Figure 8:
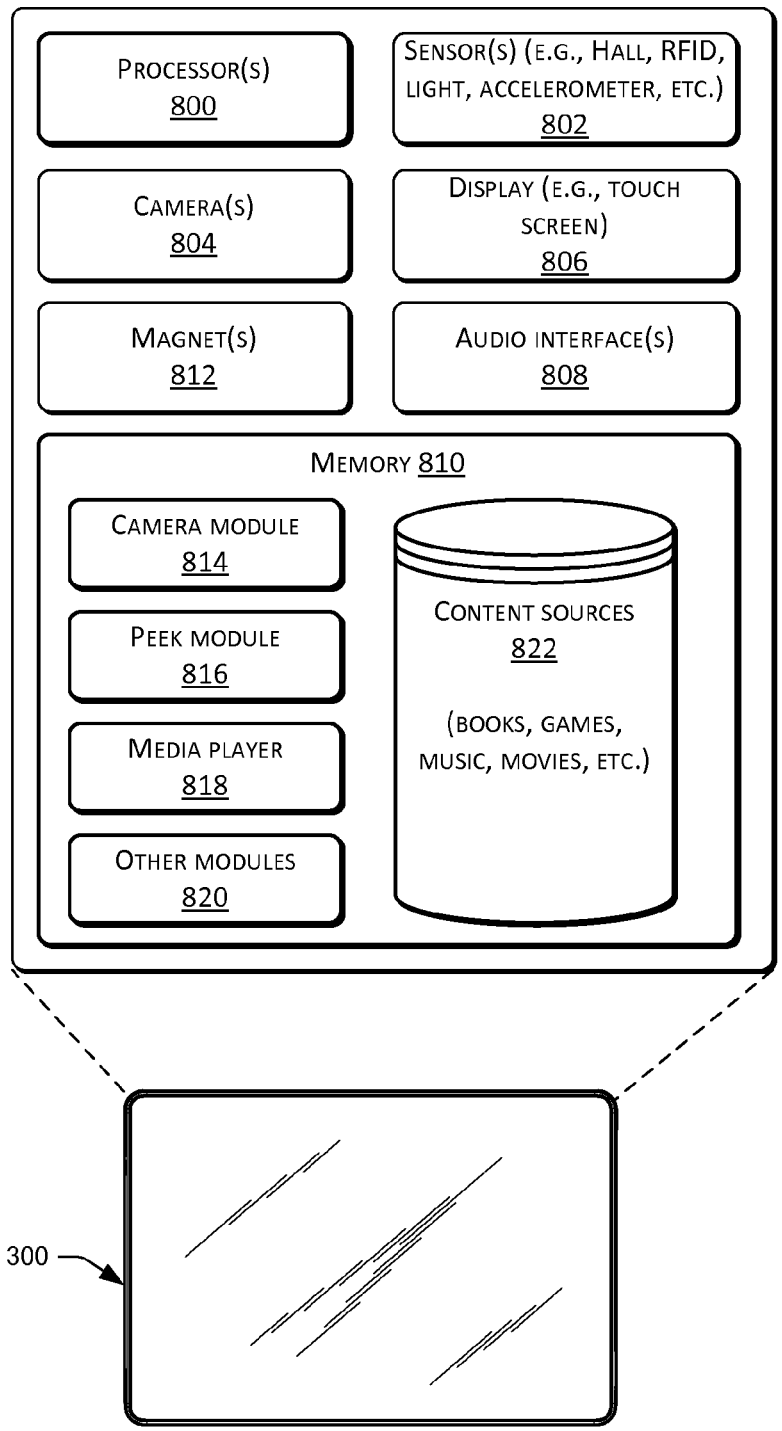
FIG. 8 is a block diagram of an example electronic device usable to implement one or more functions (e.g., launching a camera application, displaying information, turning on a display, waking the electronic device, etc.) responsive to movement of at least a portion of a cover relative to the electronic device.

FIG. 8 is a block diagram illustrating the example electronic device 300 in more detail. By way of example and not limitation, electronic device 300 may be configured as an electronic book reader device, tablet computer, mobile device, portable gaming device, electronic picture frame, display screen, or the like. As shown in FIG. 8, the electronic device 300 includes one or more processors 800 communicatively coupled to one or more sensors 802, one or more cameras 804, a display 806, one or more audio interfaces 808, and memory 810. The electronic device 300 may also include one or more ferromagnetic elements 812 (e.g., magnets or ferrous metal pieces) disposed in the electronic device to at least one of attract, or be attracted by, ferromagnetic elements in a cover (e.g., elements 400A-400D, 402A-402D, 1204, 1206, 1210, 1212, 1214, and/or 1216).

The sensors 802 may include one or more Hall effect sensors, RFID readers, or other sensors to detect the presence and/or motion of one or more activation mechanisms in one or more accessory devices (e.g., activation mechanisms 404 and 406 in cover 100). The sensors 802 may also include one or more other sensors, such as light sensors, accelerometers, touch sensors, transceivers (e.g., WiFi, Bluetooth, near field communication, etc.), navigation sensors (e.g., compass, global positioning satellite system, etc.), or the like. Further, though they are shown as separate blocks in this figure, the camera(s) 804 and audio interface(s) 808 of the electronic device are also examples of sensors of the electronic device.

The camera(s) 804 may include the rear facing camera 500 and associated flash shown in FIG. 5A and/or the front facing camera 714 on the front of the electronic device 300.

The display 806 may comprise, for example, a liquid crystal display (LCD), a light emitting diode display (LED), a plasma display, an electronic ink (e-ink) display, a cathode ray tube (CRT) display, a combination of any of the foregoing, or other display technologies. In some examples, the display 806 may comprise a touch screen display capable of receiving input by touching the screen with a finger, hand, thumb, stylus, or other pointing device.

The audio interface(s) 808 may include one or more audio inputs (e.g., microphones, audio-in jacks, etc.) and/or one or more audio outputs (e.g., speakers, headphone jack, etc.).

Memory 810 may include a plurality of modules to implement various operations responsive to relative movement of the electronic device 300 and a cover. For instance, the memory 810 may include a camera module 814 that controls operation of the camera(s) 804 and provides a user interface for the user to interact with and control the camera(s) 804. The camera module 814 may be activated or launched by opening an application or selecting an icon or other control corresponding to the camera module 814. Additionally or alternatively, the camera module 814 may be activated in response to detection, by one of the sensors 802, of movement of the electronic device 300 relative to a cover 100. The camera module 814 may comprise a native module provided by a manufacturer of the device, or it may comprise an application or module developed by a third party developer. Additionally, the camera module 814 may be a camera-specific module dedicated to controlling operation of the camera(s) 804, or it may be another application configured to make use of the camera(s) 804 (e.g., a text messaging application, an email application, an optical scanner application, an augmented reality application, etc.). In the event that the camera module 814 has not previously been activated by movement of the cover relative to the electronic device 300, the camera module 814 may cause instructions to be output for presentation on the display 806 of the electronic device 300. Depending on a mode of the electronic device 300 at a time when the sensor(s) 802 detect the movement of the cover 100, the camera module 814 may control access to other functions of the electronic device 300 (e.g., limit access to content, location, personal information, etc.).

The memory 810 also includes a peek module 816, which may be configured to implement various operations in response to movement of a portion (less than all) of a cover covering the display 806 of the electronic device 300. For instance, the peek module 816 may activate a first operation in response to detecting, by a first of the sensor(s) 802, movement of a first portion (e.g., a corner of front cover 102) relative to the electronic device. The peek module 816 may activate a second operation, different than the first operation, in response to detecting, by a second of the sensor(s) 802, movement of a second portion (e.g., a different corner of front cover 102) relative to the electronic device. The first and second operations activated by the peek module 816 may be any of those discussed above in the discussion of the "Peek" use case. In some examples, the peek module 816 may simply provide an interface to present and/or repackage information from one or more other modules 820 (e.g., a clock module, weather module, calendar module, text message module, email module, phone module, media player 818, etc.) and/or content sources 822. In one specific example, the peek module 816 may activate a media player 818 of the electronic device 300 to begin playing audio content. Additionally or alternatively the peek module 816 may activate the media player to display content (e.g., artist and/or song title, album cover, video content, etc.) in a portion of the display 806 of the electronic device 300 uncovered by lifting the portion of the front cover 102. In other examples, the peek module 816 may itself perform the operations activated (e.g., the peek module 816 may contain a clock, weather application, calendar, media player, etc.). In response to detection of movement of both the first and second portions concurrently, the peek module 816 may be configured to perform a third operation such as any of those discussed above in the discussion of the "Peek" use case.

Memory 810 is shown to include software functionality configured as one or more applications or "modules." However, the modules are intended to represent example divisions of the software for purposes of discussion, and are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.).

The modules may include instructions executable by the one or more processors 800 to implement the functionalities they are described as performing. The electronic device 300 may additionally or alternatively include one or more hardware components (e.g., application specific integrated circuits, field programmable gate arrays, systems on a chip, and the like) to implement some or all of the functionalities the modules are described as performing.

The memory 810 described herein is an example of computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include transitory media, such as modulated data signals and carrier waves.

Example Methods of Operation

FIG. 9 is a flowchart illustrating an example method 900 of activating an operation or function of an electronic device responsive to motion of the electronic device relative to a cover. The example method 900 is described with reference to electronic device 300 and cover 100 for ease of understanding. However, the method 900 is not limited to use with electronic device 300 and cover 100.

The method 900 includes, at block 902, detecting, by the electronic device 300, the presence of the cover 100. As discussed above, the electronic device 300 may detect the presence of the cover 100 using a sensor, such as a Hall effect sensor, RFID reader, or the like to detect an activation mechanism (e.g., magnet, RFID chip, or the like) in the cover 100. For instance, when the electronic device 300 is placed in the receptacle 302 of the cover 100 (or when it is turned on if it is off when placed in the cover), the electronic device may detect the presence of the activation mechanism 404A in the back cover 104 of the cover 100.

At block 904, the electronic device 300 may activate one or more operations in response to detecting the presence of the cover. For example, if the electronic device 300 has not previously been placed in the cover 100 (or another cover), the electronic device 300 may launch a tutorial or otherwise output instructions describing the features of the cover and/or how the cover works with the electronic device. Outputting the instructions may comprise presenting text and/or video on the display 806 of the electronic device 300 and/or outputting audio instructions from one or more speakers or other audio interfaces 808 of the electronic device 300. For purpose of this disclosure, the electronic device 300 may determine that it has not previously been placed in a cover if this is the very first time the electronic device has been placed in a cover, if this is the first time the electronic device has been placed in a cover by a particular user (e.g., following a deregistration by one user and a registration by a new user), if this is the first time the electronic device has been placed in a cover following a factory reset, or if this is the first time the electronic device has been placed in a cover following another resetting event that indicates a likelihood that the tutorial or instructions may be desired by a user.

As another example, in response to detecting presence of the cover 100, the electronic device 300 may, at block 904, change an audio setting of the electronic device. That is, the electronic device 300 may change an audio setting to account for or take advantage of the fact that the electronic device 300 is placed in the cover 100. Examples of audio settings that may be changed include, for example, volume, stereo vs. mono, frequency response, audio signal processing algorithms (e.g., Dolby, surround sound, etc.). In one specific example, the electronic device 300 may adjust a volume level to maintain a same perceived volume to a user when in the cover 100 as without the cover 100. In an additional or alternative example, the electronic device 300 may adjust a frequency response of the electronic device 300 to maintain a same perceived sound characteristic to a user when in the cover 100 as without the cover 100. In an additional or alternative example, the electronic device 300 may implement a Dolby audio signal processing algorithm responsive to detecting the presence of the cover 100. Activation of the one or more operations may be performed in response solely to detection of presence of the cover, or in response to detection of presence of the cover along with one or more other factors (e.g., orientation of the device, user preferences, mode of the device, applications running, etc.).

At block 906, the electronic device 300 may detect movement of the cover 100 relative to the electronic device 300. For example, the electronic device 300 may detect sliding movement of the electronic device 300 relative to the back cover 104 from the first position to the second position shown in FIG. 5A and FIG. 5B. As another example, the electronic device 300 may detect lifting of a portion of the front cover 102 from the display of the electronic device 300.

At block 908, the electronic device 300 may determine an operation to activate. The operation to activate may depend upon the sensor(s) of that detected the movement. For instance, if a sensor of the electronic device 300 detects the presence of the activation mechanism 404B, the electronic device 300 may determine to activate the camera module 814, since detection of the activation mechanism 404B denotes the sliding movement of the electronic device 300 to expose the camera 500 of the electronic device 300. If, on the other hand, if a sensor of the electronic device 300 detects lifting of activation mechanism 406B, the electronic device 300 may determine to activate the peek module 816 to perform a first operation (e.g., displaying a date and time, playing audio content, increasing a volume, etc.). Further, if a sensor of the electronic device 300 detects lifting of activation mechanism 406C, the electronic device 300 may determine to activate the peek module 816 to perform a second, different operation (e.g., displaying weather information, stopping or pausing audio content, decreasing a volume, etc.). Still further, if sensors of the electronic device 300 detect lifting of activation mechanisms 406B and 406C concurrently, the electronic device 300 may determine to activate yet another operation (e.g., waking the electronic device 300). In embodiments in which the electronic device 300 includes additional sensors and/or the cover includes additional activation mechanisms, the electronic device 300 may determine to activate the same or different operations in response to detecting such activation mechanisms by such sensors.

Once the electronic device 300 determines an operation to activate, at block 910, the electronic device 300 determines whether or not the particular operation has been activated before (or whether it has been activated in the same way before). For instance, if the electronic device 300 determines that the camera module 814 has not previously been activated by movement of the cover 100 relative to the sensor 404B, the electronic device 300 may, at block 912, cause a tutorial or instructions for use to be output for presentation on the display 806 of the electronic device 300. Again, outputting the instructions may comprise presenting text and/or video on the display 806 of the electronic device 300 and/or outputting audio instructions from one or more speakers or other audio interface(s) 808 of the electronic device 300.

If the determined operation has previously been performed, or after outputting the instructions, the electronic device 300 may, at block 914, determine a current mode of the electronic device 300 at a time when the sensor detects the movement of the cover 100. The electronic device may determine, at block 916, whether to control access to other functions of the electronic device 300 based at least in part on the mode of the electronic device 300 at the time when the sensor detects the movement of the cover 100. At block 918, the electronic device 300 activates the determined operation taking into account any access restrictions determined at block 916. For instance, if the electronic device 300 determines that the display 806 is locked when a sensor detects the camera activation mechanism 404B, the electronic device 300 may limit access of the camera module 814 to only those pictures taken during the current photography session. As another example, if the display 806 is locked when a sensor detects one of the peek activation mechanisms 406B or 406C, the electronic device may cause the peek module 816 to present only non-personal information and/or may prevent the peek module 816 from accessing personal information (e.g., location information). As yet another example, if the electronic device 300 is running an application that makes use of the camera (e.g., a text messaging application) when a sensor detects the camera activation mechanism 404B, the electronic device may persist the currently running application rather than activating the camera module 814. That is, the electronic device 300 may refrain from launching a camera-specific application if another application that makes use of the camera(s) 804 is already open. Activation of the one or more operations responsive to relative movement of the electronic device and the cover may be further based at least in part one or more other factors (e.g., orientation of the device, user preferences, mode of the device, applications running, etc.).

The flow of operations illustrated in FIG. 9 is illustrated as collections of blocks and/or arrows representing sequences of operations that can be implemented in hardware, software, firmware, or a combination thereof. The order in which the blocks are described is not intended to be construed as a limitation, and any number of the described operations can be combined in any order to implement one or more methods, or alternate methods. Additionally, individual operations may be omitted from the flow of operations without departing from the spirit and scope of the subject matter described herein. In the context of software, the blocks represent computer-readable instructions that, when executed by one or more processors, perform the recited operations. In the context of hardware, the blocks may represent one or more circuits (e.g., application specific integrated circuits—ASICs) configured to perform the recited operations.

Example Folding Configurations

FIGS. 10A-10C illustrate three different positions into which the cover 100 is movable. Specifically, FIG. 10A, FIG. 10B, and FIG. 10C illustrate a closed position, an open position, and a stand position, respectively, into which the cover 100 is movable. In this example, the front cover 102 comprises a foldable flap comprising multiple substantially planar panels coupled together by flap hinges.

In the closed position, shown in FIG. 10A, the front cover 102 is substantially planar and covers an opening of the receptacle of the back cover 104. This is the position in which the electronic device 300 would likely be stored during periods of non-use.

In the open position, shown in FIG. 10B, front cover 102 folded 180 degrees about the back cover 104 via flexible hinge 200, such that the front cover 102 is substantially planar and lies substantially parallel and adjacent to an outer surface of the back cover 104. This is the position in which the cover 100 would likely be when the user is holding the electronic device 300 and/or when the electronic device 300 is laid flat on a table, lap, or other support surface.

In the stand position, shown in FIG. 10C, the front cover 102 folds to form a stand to support the back cover (and an electronic device supported thereby) at an angle θ relative to a support surface on which the cover is placed. This is the position in which the cover 100 would likely be when the user is watching a movie or reading a book while sitting in front of a table or other support surface.

Generally, the angle θ may be any angle usable to propan object for viewing, reading, or other use. In most embodiments, the angle θ may be at least about 30 degrees and at most about 75 degrees relative to the support surface. In some embodiments, the angle θ may be at least about 45 degrees and at most about 65 degrees. In the specific embodiment shown in FIG. 10C, the angle θ is shown to be about 52 degrees relative to the support surface.

The angle θ may vary depending on an angle at which the object is desired to be propped. The geometry of the substantially planar panels 202 and the flexible hinges 204 and 206 may be tailored to achieve the desired angle θ in the stand position. Further, the angle θ may be varied during use by adjusting placement of the portions of the front cover 102 that contact the support surface (as described further with respect to FIGS. 11A and 11B).

When an electronic device has speakers located at or near a top of the electronic device, as shown schematically at 1002A, and spaced a distance from the back surface 104 of the cover 100, sound emitted from the speakers is reflected back toward the user as shown by dashed line 1004A. Specifically, back surface 104 reflects and amplifies the sound to the user to be greater than if the user were listening to the electronic device without a cover. When an electronic device has speakers located on a back surface of the electronic device, as shown schematically at 1002B, and the cover 100 has speaker ports as shown at 1006, sound emitted from the speakers passes through the speaker ports 1006 in the cover 100 and is reflected back toward the user as shown by dashed line 1004B. Specifically, the folded front cover 102 reflects and amplifies the sound to the user to be greater than if the user were listening to the electronic device without a cover. FIG. 10C shows sound emitted at two different locations, namely speakers 1002A and 1002B, in practice electronic devices may have speakers at only location 1002A (in which case speaker ports 1006 may be omitted), only location 1002B, or both locations 1002A and 1002B. Use of the cover 100 in the stand position with electronic devices having speakers at locations 1002A and/or 1002B may increase the sound output at a viewing location in front of the electronic device by as much as 10 decibels (dB) at certain frequencies.

Figure 11A:
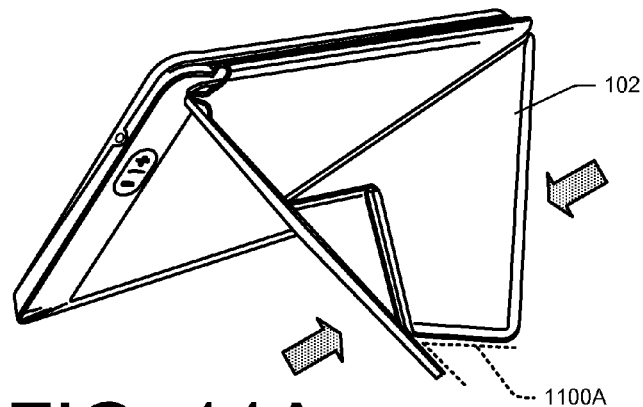
FIG. 11A, FIG. 11B, and FIG. 11C illustrate three different orientations in which the example cover of FIG. 1A
Figure 11B:
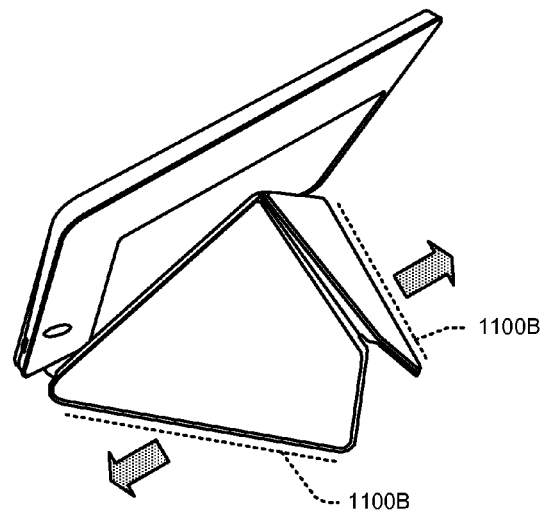
Figure 11C:
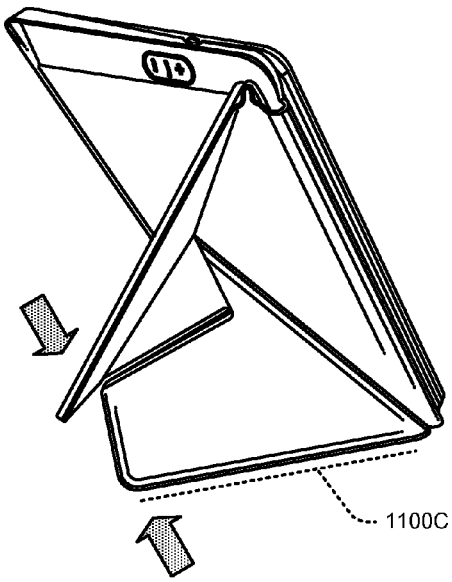

FIG. 11A, FIG. 11B, and FIG. 11C illustrate three different orientations in which the cover 100 is configured to support an electronic device when the cover is in the stand position. FIG. 11A illustrates an electronic device supported by the cover 100 in a standard landscape orientation. This figure is a perspective view of the cover 100 in the same position shown in FIG. 10C. In this orientation, the folded front cover 102 contacts the support surface at substantially the locations 1100A shown in dashed lines. In this orientation, the weight of the electronic device presses generally downward. Due to the centrally located and inwardly sloping surfaces of the front cover 102 at the contact points 1100A with the ground, the weight distribution of the electronic device tends to press the outer lateral edges of the front cover 102 inward, toward the folded position, as shown by the arrows in FIG. 11A. This inward force increases the stability of the cover in this orientation.

FIG. 11B illustrates an electronic device supported by the cover 100 in an inverted or flipped landscape orientation. In this orientation, outside lateral edges of the front cover 102 contact the support surface at dashed lines 1100B. Thus, due to the laterally located and outwardly sloping surfaces of the front cover 102 at the contact points 1100B with the ground, the weight distribution of the electronic device tends to press the outer lateral edges of the front cover 102 apart, as shown by the arrows in FIG. 11B. Thus, the cover 100 is maintained in the stand position in this orientation by magnets (described in detail with reference to FIG. 12) and by the frictional forces between the cover and the support surface at the contact points 1100B.

FIG. 11C illustrates an electronic device supported by the cover 100 in a portrait orientation. In this orientation, the folded front cover 102 contacts the support surface at substantially the location 1100C shown in dashed lines. In this orientation, the weight distribution of the electronic device tends to press the outer lateral edges of the front cover 102 inward, toward the folded position, as shown by the arrows in FIG. 11C. This inward force increases the stability of the cover in this orientation.

By pulling apart the outer lateral edges of the front cover 102 in the standard landscape orientation (FIG. 11A) and/or the inverted landscape orientation (FIG. 11B) a user can continuously adjust the stand angle at which the electronic device is propped to any angle between about 35 degrees and about 85 degrees.

Example Cover Construction

Figure 12:
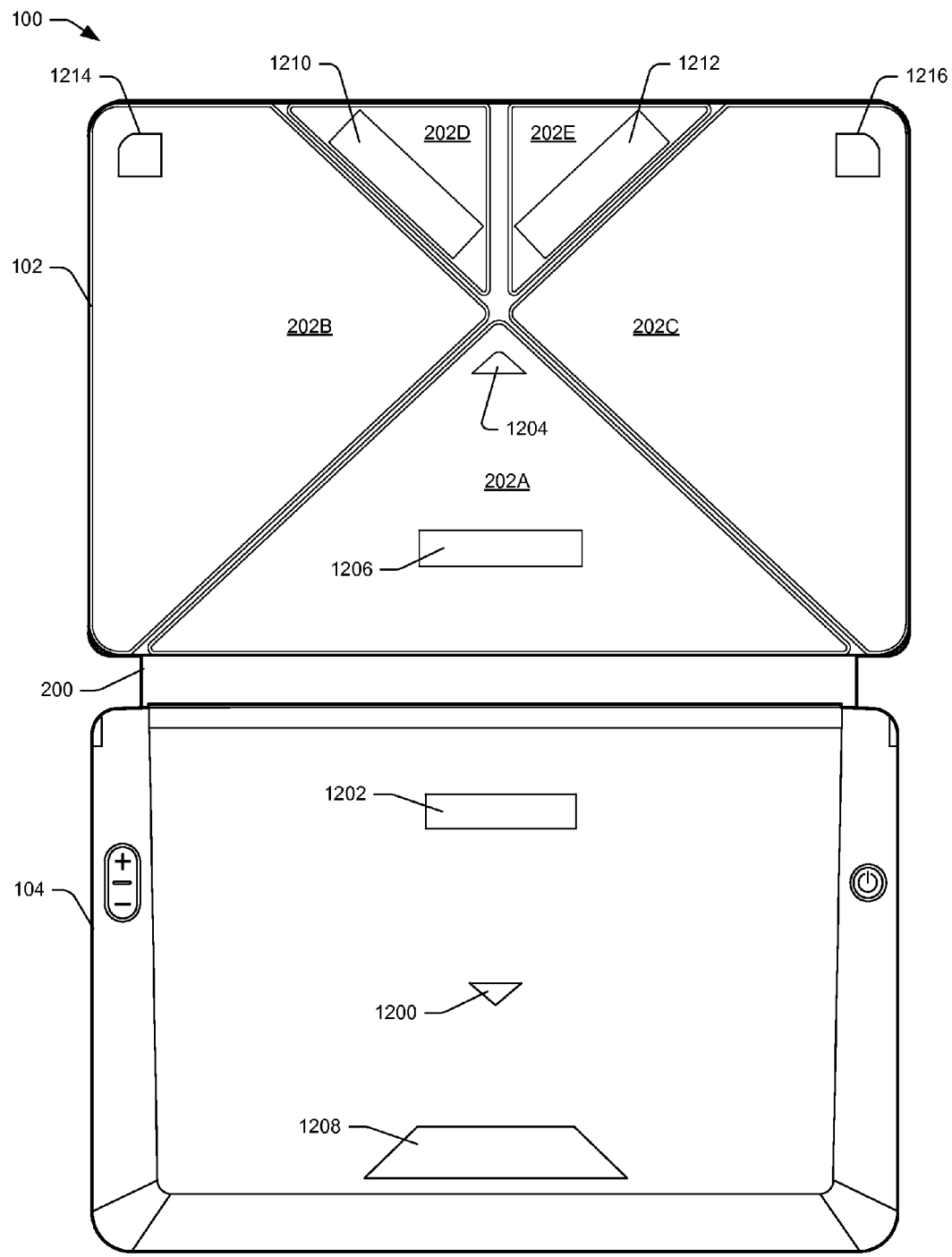
FIG. 12 is schematic view of the example cover of FIG. 1A and FIG. 1B, showing example locations of elements that may be used to hold the cover in one or more positions.

In some embodiments, the cover 100 may include multiple different ferromagnetic elements to hold the cover 100 in the various different positions. These magnets may be in addition to or instead of the magnets shown in FIG. 4 to retain the electronic device and/or to activate one or more operations of the electronic device. In some embodiments, one or more magnets may serve dual purposes, i.e., to hold the cover 100 in one position and to activate one or more operations in another position. FIG. 12 is schematic view of cover 100, showing example locations of ferromagnetic elements that may be used to hold the cover in one or more positions.

In the example of FIG. 12, the cover 100 includes ferromagnetic stand elements 1200 and 1202 disposed in the back cover 104 and positioned to at least one of attract, or be attracted by, ferromagnetic stand elements 1204 and 1206, respectively, disposed in the foldable flap when the foldable flap is in both the open position and the stand position.

The cover 100 in this example also includes a ferromagnetic stability element 1208 disposed in the back cover 104 and positioned to at least one of attract, or be attracted by, ferromagnetic stability elements 1210 and 1212 disposed in the front cover 102 to hold the front cover 102 substantially planer when in the open position. Specifically, the ferromagnetic stability elements 1210 and 1212 are disposed in the two smallest substantially planar panels 202D and 202E located in the longitudinal center of the front cover 102 and distal from the flexible hinge 200. Because of its foldable nature, the front cover 102 tends to be unstable (e.g., floppy). The stability elements 1210 and 1212 in the front cover 102 are at least one of attracted to, or by, the stability element 1208 disposed in the back cover 104, thereby stabilizing and securing the front cover 102 flat against the back cover in the open position. In the stand position, the ferromagnetic stability elements 1210 and 1212 disposed in the foldable flap 102 are positioned to at least one of attract, or be attracted by, each other to hold the panels 202D and 202E together (as best shown in FIG. 11A). Each of the ferromagnetic stand elements 1200, 1202, 1204, and 1206, and each of the ferromagnetic stability elements 1208, 1210, and 1212 may comprise one or more magnets and/or pieces of ferrous metal. Moreover, the size, shape, and position of each of these elements shown in the figures are merely examples and may be different in other embodiments.

The ferromagnetic stand elements 1200, 1202, 1204 and 1206 may be magnetically shielded on an inner side so as not to expose the electronic device to magnetic fields when the cover 100 is in the closed position. Similarly, the ferromagnetic stability elements 1210 and 1212 may be shielded on the inner side of the front cover 102 (i.e., the side closest to the electronic device in the closed position).

In addition to the ferromagnetic stability elements 1210 and 1212, the cover 100 may include other features to maintain the cover 100 in the stand position. For example, the cover 100 may include rubber or non-slip materials disposed at one or more locations (e.g., corners, edges, sides, and or surfaces) on the front cover 102 and/or the back cover 104 to increase friction between the cover and the support surface.

In some implementations, the cover 100 may additionally include ferromagnetic flap elements 1214 and 1216 to at least one of attract, or be attracted by, ferromagnetic flap elements in the electronic device to hold the front cover 102 in the closed position.

As discussed above, the cover 100 includes several features to aid users in correctly folding the front cover 102 into the stand position. FIGS. 13A-13C illustrate features of the cover 100 that prevent the cover 100 from being folded incorrectly. For example, FIG. 13A illustrates that the directional flap hinge 204 between panels 202B and 202D bind, preventing further folding in that direction. FIG. 13B illustrates that the directional flap hinge 204 between panels 202A and 202C bind, preventing further folding in that direction. FIG. 13C illustrates that because the ferromagnetic stability elements 1210 and 1212 are shielded on the inner side of the front cover 102 (i.e., the side closest to the electronic device in the closed position), the panels 202D and 202E are prevented from sticking together incorrectly (inside-to-inside).

Figure 14A:
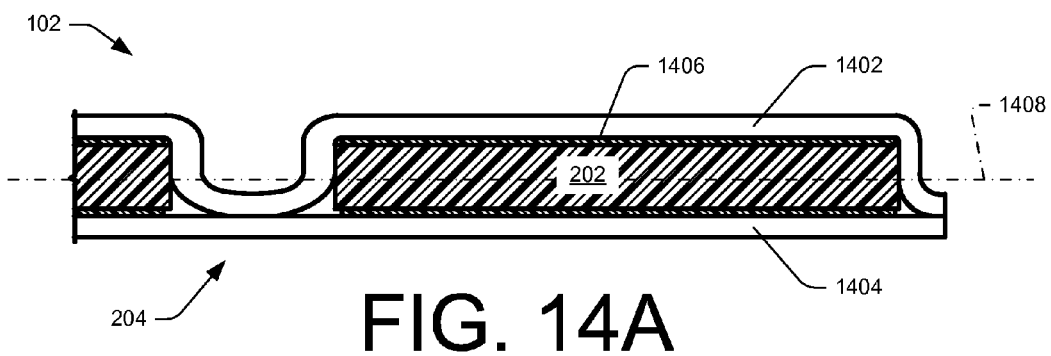
FIGS. 14A-14C are partial cross-sectional views of an example foldable flap of a cover for an electronic device having a directional hinge that limits folding in one direction (see FIG. 14B) while allowing folding in an opposite direction (see FIG. 14C).
Figure 14B:
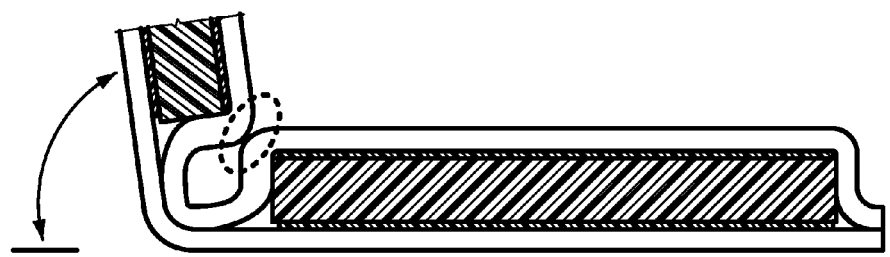
Figure 14C:
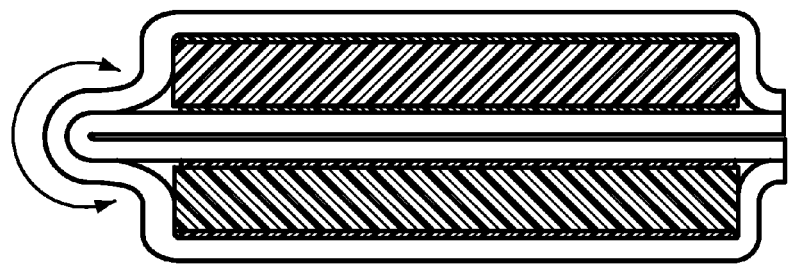

FIGS. 14A-C illustrate details of an example construction of the front cover 102 and the directional flap hinges 204. FIG. 14A is a partial cross sectional view of the front cover 102. As shown in FIG. 14A, the front cover 102 includes the substantially planar panels 202 interposed between a flexible outer surface 1402 and a flexible inner surface 1404. The flexible outer surface 1402 and a flexible inner surface 1404 may be secured to the substantially planar panels 202 by adhesive 1406, sonic welding, stitching, or any other suitable attachment means.

The front cover 102 has a central plane bisecting the substantially planar panels 202 when the front cover 102 is in a position parallel with the back cover 104 (e.g., when the cover 100 is in the open or closed positions). The directional hinges 204 comprise the flexible inner surface 1402 and the flexible outer surface 1404 at gaps between adjacent ones of the substantially planar panels 202. In these gaps, the flexible inner surface 1402 and the flexible outer surface 1404 come together and are disposed on a same side of the central plane 1408 (shown below in FIG. 14A). The flexible inner surface 1402 and the flexible outer surface 1404 may be bonded (e.g., by adhesive, welding, etc.) or otherwise joined (e.g., stitching, etc.) in the gaps between the substantially planar panels 202. In some embodiments (not shown), one or more layers of foam, padding, rubber, or other material may additionally be disposed between the flexible inner surface 1402 and the panels 202 and/or between the flexible outer surface 1404 and the panels 202.

The flexible inner surface 1402 and the flexible outer surface 1404 may be made of the same or different materials. In one example, the flexible outer surface 1402 is made of leather and the flexible inner surface 1404 is made of a microfiber material. However, in other examples, the flexible inner surface 1402 and/or the flexible outer surface 1404 may be made of polyurethane, ethylene-vinyl acetate, foam rubber, silicone, polyethylene, nylon, microfiber, natural or synthetic cloth, leather, combinations of the foregoing or other flexible materials.

By virtue of the forgoing construction, the directional flap hinges 204 bind and prevent the adjacent panels 202 from folding relative to each other in one direction (clockwise), as shown in FIG. 14B. The directional flap hinges 204 allow adjacent panels 202 to fold relative to each other in a second, opposite direction (counterclockwise), as shown in FIG. 14C. In this way, the directional hinges 204 allow the front cover to fold into the stand position, while preventing the front cover 102 from being folded incorrectly.

Figure 15:
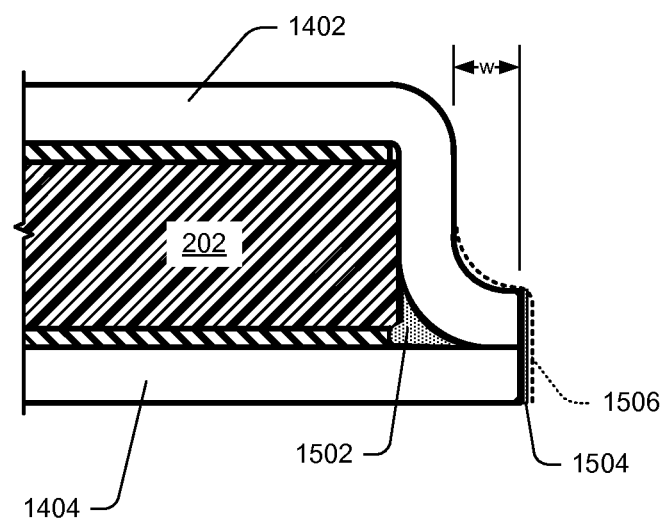
FIG. 15 is a partial cross-sectional view of an example flap of a cover for an electronic device having a low-profile edge seam.

FIG. 15 illustrates an example edge construction technique that is usable to join the flexible inner surface 1404 and flexible outer surface 1402 together at a seam around at least a portion of the periphery of the front cover 102. Using this technique, a low profile seam or flange can be formed extending at most 0.5 millimeters beyond an outer periphery of the substantially planar panels 202. This technique is accomplished by applying adhesive 1502 in a bead around the outer periphery of the substantially planar panels 202 before the flexible inner surface 1404 and flexible outer surface 1402 are pressed together. Subsequently, the outer periphery of the front cover 102 may be trimmed and additional adhesive 1504 may be applied to the outer perimeter. Additionally or alternatively, a coating of edge paint 1506 may be applied to the outer perimeter of the front cover 102 to further seal the seam or flange. This technique achieves a low profile seam or flange that extends far less than existing covers having flexible inner and outer surfaces bonded around a core.

CONCLUSION

While various examples and embodiments are described individually herein, the examples and embodiments may be combined, rearranged and modified to arrive at other variations within the scope of this disclosure. For instance, an example cover according to this disclosure may include the features illustrated in FIGS. 4 and 12.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   an electronic device comprising:
   a display;
   a first Hall effect sensor disposed in a first corner of the electronic device; and
   a second Hall effect sensor disposed in a second corner of the electronic device; and
   a cover coupled to the electronic device, the cover comprising:
   a flap coupled to the electronic device by a flexible hinge, the flap configured to cover the display of the electronic device when the cover is in a closed position, the flap comprising:
   a first magnet disposed proximate a first corner of the flap and aligned with the first Hall effect sensor when the cover is in the closed position; and
   a second magnet disposed proximate a second corner of the flap and aligned with the second Hall effect sensor when the cover is in the closed position,
   wherein the electronic device is configured to:
   in response to detecting, by the first Hall effect sensor, lifting of the first magnet in the first corner of the flap, display first information on at least a first portion of the display of the electronic device, and
   in response to detecting, by the second Hall effect sensor, lifting of the second magnet in the second corner of the flap while the first corner of the flap is covering the first portion of the display, display second information, different than the first information, on at least a second portion of the display of the electronic device.

2. The system of claim 1, wherein:
   the flap comprises multiple substantially planar panels, each panel of the multiple substantially planar panels being foldably coupled to at least one other panel of the multiple substantially planar panels by a flap hinge,
   the first magnet is coupled to a first substantially planar panel of the multiple substantially planar panels, and
   the second magnet is coupled to a second substantially planar panel of the multiple substantially planar panels.

3. The system of claim 2, wherein the first portion of the display corresponds to a portion of the display uncovered by the lifting of the first magnet and the first substantially planar panel, and the second portion of the display corresponds to a portion of the display uncovered by the lifting of the second magnet and the second substantially planar panel.

4. An apparatus comprising:
   a cover for an electronic device, the cover comprising a flap configured to couple to the electronic device and to selectively cover a display of the electronic device, the flap comprising:
   a flexible hinge disposed along an edge of the flap;
   a first substantially planar panel comprising a first corner of the flap that is distal to the flexible hinge, the first substantially planar panel having a first activation mechanism;
   a second substantially planar panel comprising a second corner of the flap that is distal to the flexible hinge, the first substantially planar panel having a second activation mechanism; and
   a third substantially planar panel comprising the edge of the flap along which the flexible hinge is disposed, the first substantially planar panel being coupled to the third substantially planar panel by a first flap hinge, and the second substantially planar panel being coupled to the third substantially planar panel by a second flap hinge.

5. The apparatus of claim 4, wherein at least one of the first activation mechanism or the second activation mechanism comprises a magnet.

6. The apparatus of claim 4, further comprising a back cover including a tray having a receptacle in a front of the tray sized to receive the electronic device and having one or more retention mechanisms to retain the electronic device in the tray.

7. The apparatus of claim 6, further comprising an activation mechanism disposed in the back cover.

8. The apparatus of claim 4, further comprising the electronic device, the electronic device comprising:
   the display;
   a first sensor disposed in a first location of the electronic device that is aligned with the first activation mechanism of the flap when the flap covers the display of the electronic device; and
   a second sensor disposed in a second location of the electronic device that is aligned with the second activation mechanism of the flap when the flap covers the display of the electronic device.

9. The apparatus of claim 8, wherein the electronic device is configured to:
   in response to detecting, by the first sensor, lifting of the first activation mechanism in the first region of the flap, display first information on at least a first portion of the display of the electronic device, and in response to detecting, by the second sensor, lifting of the second activation mechanism in the second region of the flap, display second information, different than the first information, on at least a second portion of the display of the electronic device.

10. The apparatus of claim 8, wherein at least one of the first sensor or the second sensor comprises a Hall effect sensor.

11. The apparatus of claim 4, wherein the first flap hinge and the second flap hinge intersect.

12. A method comprising:
under control of one or more processors configured with specific executable instructions,
detecting, with a first sensor of an electronic device, a lifting of a first portion of a flap, the lifting of the first portion of the flap uncovering a first portion of a display of the electronic device;
detecting, with a second sensor of the electronic device, a closed state of a second portion of the flap, the closed state of the second portion of the flap covering a second portion of the display of the electronic device;
causing an operation of the electronic device in response to detecting the lifting of the first portion of the flap and the closed state of the second portion of the flap;
detecting, with the second sensor of the electronic device, a lifting of the second portion of the flap, uncovering the second portion of the display of the electronic device;
detecting, with the first sensor, a closed state of the first portion of the flap, the closed state of the first portion of the flap covering the first portion of the display of the electronic device; and
causing another operation of the electronic device in response to detecting the lifting of the second portion of the flap and the closed state of the first portion of the flap.

13. The method of claim 12, wherein the operation comprises displaying information on at least the first portion of the display of the electronic device uncovered by the lifting of the first portion of the flap.

14. The method of claim 12, wherein the operation comprises displaying information substantially only on the first portion of the display of the electronic device uncovered by the lifting of the first portion of the flap.

15. The method of claim 12, wherein the operation comprises changing an audio setting of the electronic device.

16. The method of claim 12, wherein:
the operation comprises displaying first information on at least the first portion of the display of the electronic device uncovered by the lifting of the first portion of the flap, and
the other operation comprises displaying second information, different than the first information, on at least the second portion of the display of the electronic device uncovered by the lifting of the second portion of the flap.

17. The method of claim 12, wherein each of the operation and the other operation comprises a different one of:
displaying a time;
displaying weather information;
displaying calendar information;
displaying financial information;
displaying an email message;
displaying a text message;
displaying a photograph;
displaying an image;
displaying a video;
displaying voicemail information;
displaying call information; or
changing an audio setting of the electronic device.

18. The method of claim 12, wherein at least one of the first sensor or the second sensor comprises a Hall effect sensor.

19. The method of claim 12, wherein at least one of the first sensor or the second sensor comprises a light sensor or front facing camera of the electronic device.

20. The method of claim 12, further comprising:
detecting the lifting of another portion of the flap substantially concurrently with detecting the lifting of the portion of the flap; and
responsive to the detecting the lifting of the portion and the other portion concurrently, turning on the whole display of the electronic device or waking the electronic device.

21. An electronic device comprising:
one or more processors;
a first sensor configured to detect motion of a first portion of a cover relative to the electronic device;
a second sensor configured to detect motion of a second portion of the cover relative to the electronic device; and
memory storing specific instructions that, when executed, configure the one or more processors to perform operations comprising:
activating a first operation in response to detecting, by the first sensor, movement of the first portion of the cover relative to the electronic device;
activating a second operation, different than the first operation, in response to detecting, by the second sensor, movement of the second portion of the cover relative to the electronic device, and in response to detecting, by the first sensor, a lack of movement of the first portion of the cover relative to the electronic device.

22. The electronic device of claim 21, wherein at least one of the first sensor or the second sensor comprises a Hall effect sensor.

23. The electronic device of claim 21, wherein at least one of the first sensor or the second sensor comprises a light sensor or front facing camera of the electronic device.

24. The electronic device of claim 21, wherein the first sensor is located proximate a first corner of the electronic device and the second sensor is located proximate a second corner of the electronic device.

25. The electronic device of claim 21, wherein:
the first operation comprises displaying first information on at least a first portion of a display of the electronic device, and
the second operation comprises displaying second information, different than the first information, on at least a second portion of the display of the electronic device.

26. The electronic device of claim 21, wherein:
the movement of the first portion of the cover relative to the electronic device comprises lifting of the first portion of the cover to uncover a first portion of the display,
the movement of the second portion of the cover relative to the electronic device comprises lifting of the second portion of the cover to uncover a second portion of the display, which is different than the first portion of the display,
the first operation comprises displaying first information on substantially only the first portion of the display uncovered by the movement of the first portion of the cover, and
the first operation comprises displaying second information, different than the first information, on substantially only the second portion of the display uncovered by the movement of the second portion of the cover.

27. The electronic device of claim 21, wherein the first operation and the second operation each comprises a different one of:
- displaying a time;
- displaying weather information;
- displaying calendar information;
- displaying financial information;
- displaying an email message;
- displaying a text message;
- displaying a photograph;
- displaying an image;
- displaying a video;
- displaying voicemail information;
- displaying call information; or
- changing an audio setting of the electronic device.

28. The electronic device of claim 21, the operations further comprising activating a third operation, different than the first and second operations, in response to detecting by the first and second sensors, concurrent movement of the first and second portions of the cover relative to the electronic device,
- wherein the third operation comprises turning on a whole display of the electronic device or waking the electronic device.

29. The electronic device of claim 21, further comprising a third sensor configured to detect a presence of the cover, the operations further comprising:
- changing an audio setting of the electronic device in response to detecting, by the third sensor, the presence of the cover.

* * * * *